United States Patent
Nobori et al.

(10) Patent No.: US 7,542,834 B2
(45) Date of Patent: Jun. 2, 2009

(54) MOBILE UNIT MOTION CALCULATING METHOD, APPARATUS AND NAVIGATION SYSTEM

(75) Inventors: Kunio Nobori, Osaka (JP); Satoshi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 533 days.

(21) Appl. No.: 10/540,135

(22) PCT Filed: Oct. 15, 2004

(86) PCT No.: PCT/JP2004/015677

§ 371 (c)(1),
(2), (4) Date: Jun. 21, 2005

(87) PCT Pub. No.: WO2005/038710

PCT Pub. Date: Apr. 28, 2005

(65) Prior Publication Data

US 2006/0055776 A1    Mar. 16, 2006

(30) Foreign Application Priority Data

Oct. 17, 2003    (JP) .............................. 2003-357729

(51) Int. Cl.
*G06F 7/00* (2006.01)
*G06F 19/00* (2006.01)
(52) U.S. Cl. .................. 701/36; 348/148; 348/153; 340/435; 340/903; 340/937
(58) Field of Classification Search ................. 340/435, 340/903, 937; 348/148, 153; 701/36
See application file for complete search history.

(56) References Cited

U.S. PATENT DOCUMENTS

| 5,777,690 A | 7/1998 | Takeda et al. |
| 6,535,114 B1 | 3/2003 | Suzuki et al. |
| 6,812,831 B2 * | 11/2004 | Ikeda .......................... 340/435 |
| 7,253,389 B2 * | 8/2007 | Yoshida ................... 250/208.1 |
| 2002/0186298 A1 * | 12/2002 | Ikeda .......................... 348/148 |
| 2006/0055776 A1 * | 3/2006 | Nobori et al. ............... 348/142 |

FOREIGN PATENT DOCUMENTS

JP    08-219786    8/1996

(Continued)

OTHER PUBLICATIONS

Kruger W: "Robust real-time ground plane motion compensation from a moving vehicle"; Machine Vision and Applications Springer-Verlag Germany; vol. 11, No. 4; 1999; pp. 203-212; XP002352964: ISSN: 0932-8092.

(Continued)

*Primary Examiner*—Cuong H Nguyen
(74) *Attorney, Agent, or Firm*—Harness, Dickey & Pierce, P.L.C.

(57) ABSTRACT

In a mobile body motion calculation apparatus (100), a corresponding point calculation section (101) calculates corresponding points between images captured by a camera 120. A first motion calculation section (102) calculates a first motion (Ma) of a mobile body using the corresponding points, assuming a predetermined plane in the images. A second motion calculation section (103) calculates a second motion (Mb) using the first motion (Ma) and the corresponding points.

11 Claims, 14 Drawing Sheets

FOREIGN PATENT DOCUMENTS

| | | |
|---|---|---|
| JP | 09-237341 | 9/1997 |
| JP | 2000-275013 A | 10/2000 |
| JP | 2001-266160 A | 9/2001 |
| JP | 2003-515827 A | 5/2003 |
| JP | 2003-178309 A | 6/2003 |
| WO | 97/35161 | 9/1997 |
| WO | 01/39120 A2 | 5/2001 |
| WO | 01/39120 A3 | 5/2001 |

OTHER PUBLICATIONS

R. Wagner, K. Doner, F. Liu: "A "Half-Perspective" Approach to Robust Ego-Motion Estimation for Calibrated Cameras"; MIP-9718; Dec. 4, 1997; pp. 1-53; XP002352965; Fakultät für Mathematik und Informatik, Universität Passau, DE.

Gehrig S K et al.: "Dead reckoning and cartography using stereo vision for an autonomous car"; Intelligent Robots and Systems; 1999. IROS '99. Proceedings. 1999 IEEE/RSJ International Conference on Kyong Ju, South Korea Oct. 17-21, 1999; Piscataway, NJ, USA, IEEE, US; vol. 3; Oct. 17, 1999; pp. 1507-1512; XP010362318; ISBN: 0-7803-5184-3.

H. C. Longuet-Higgins, "A Computer Algorithm for Reconstructing a Scene From Two Projections", Nature, vol. 293, pp. 133-135, Sep. 1981.

K. Kanatani, "Gazorikai [Image Understanding]", Morikita Shuppan, 1990, (and partial English Translation).

G. P. Stein, et al., "A Robust Method for Computing Vehicle Ego-Motion", IEEE Intelligent Vehicles Symposium (IV2000), Oct. 2000.

M. Irani, et al., "Recovery of Ego-Motion Using Image Stabilization", ICVPR, pp. 454-460, Mar. 1994.

* cited by examiner (a) image (time t-1)

(b) image (time t)

(c) corresponding point (t-1 -> t)

(d) road surface plane range

(a)
correct camera motion Mj

(b)
incorrect camera motion Mj

TR (a)

(b)

(a)
road surface is inclined (b)

evaluation value $E_{ji}$ $E_j$ $0 \mid 1 \quad n \times R \quad n$
corresponding point (a)

(b)

(a)
viewpoint coordinate system is used as reference

(b)
middle point of rear wheel which contacts ground is used as reference image of indoor parking lot trajectory of moving vehicle calculated from images (world coordinate system)

MOBILE UNIT MOTION CALCULATING METHOD, APPARATUS AND NAVIGATION SYSTEM

TECHNICAL FIELD

The present invention relates to a technique of calculating a motion of a mobile body. More particularly, the present invention relates to a technique of calculating a motion of a mobile body in three-dimensional space using an image captured by a camera mounted on the mobile body itself.

BACKGROUND ART

A motion of a mobile body, such as a vehicle, a mobile robot or the like, is usually calculated by any of two methods: a method of using a sensor which detects a rotation of a wheel, an angle of a steered wheel, an acceleration, an angular acceleration or the like; and a method of using images of a surrounding of a mobile body which are captured by a camera mounted on the mobile body.

A method of using a sensor which detects a rotation of a wheel or an angle of a steered wheel is advantageously stable in because of a small error and less frequent failure of detection in certain circumstances, such as a flat and dry road surface or the like. However, this technique has a problem that a large error in principle occurs in circumstances, such as a slippery road surface or wheel, an uneven road surface or the like.

A method of using a sensor which detects an acceleration or an angular acceleration can be used to calculate a motion of a mobile body in circumstances, such as a slippery road surface or wheel, an uneven road surface or the like. However, this method has a problem that a large error occurs, for example, if a ratio of an acceleration or an angular acceleration caused by a motion or an attitude change to a gravitational acceleration is small or if noise or drift occurring in the sensor is relatively large, particularly when a road surface is not a horizontal plane or a mobile body is inclined.

On the other hand, the method of using images of a surrounding of a mobile body which are captured by a camera mounted on the mobile body can, in principle, be used to correctly calculate a motion of the mobile body even when a road surface is not a horizontal plane or the mobile body is inclined.

As a representative method of obtaining a motion of a camera using captured moving images, a method of using optical flow has been proposed. Optical flow is a vector which connects points on two temporally consecutive images, the two points corresponding to a certain one point on an object. A geometric constraint expression is established between the corresponding points and the camera motion. Therefore, when a plurality of corresponding points satisfy a predetermined condition, the camera motion can be calculated.

For example, Nonpatent Publication 1 proposes a method called an eight-point method, in which a camera motion is calculated using a set of 8 or more corresponding static points between two images. However, in the eight-point method, a result of calculation of a corresponding point includes an error. Therefore, there are widely known problems. For example, it is difficult to extract 8 or more corresponding points with a small error. In addition, the instability of an expression for deriving a camera motion leads to a large error in calculation of the camera motion even if corresponding points have a relatively small error.

When a motion of a camera is calculated using actually captured images as with the eight-point method, it is substantially impossible to eliminate a measurement error, such as a large error (like an abnormal value), noise in the images, a quantization error or the like, which occurs in image processing.

Therefore, various techniques have been proposed in order to suppress an influence of an error in the method of calculating a camera motion using images. Examples of the techniques include a method of calculating a camera motion from a smaller number of corresponding points where a constraint condition is provided between corresponding points, a method of calculating a camera motion where the number of unknown parameters is reduced in the calculation of the camera motion, a method of calculating an unknown parameter in multiple stages, a method of using a filter such as a Kalman filter or the like, and the like.

For example, Nonpatent Publication 2 and Patent Publication 1 propose a method of calculating expressions of a camera motion and a plane from four or more corresponding points where all input corresponding points are assumed to be present on the same plane. This method is an example of a method of calculating a camera motion from less than 8 corresponding points, where a plurality of corresponding points are assumed to satisfy a certain constraint condition.

If the number of corresponding points which are used in calculation of a camera motion is small, it can be expected that a probability that a calculated camera motion contains an error is reduced when the corresponding points contain an error with a certain probability. When more than four corresponding points are used, it can be expected that by calculating a camera motion using a least square error method, an influence of a measurement error contained in a corresponding point can be reduced.

For example, Patent Publication 2 proposes a method of calculating a camera motion with a small error, in which a camera motion which is calculated from selected corresponding points on a road surface plane is subjected to a Kalman filter which is prepared taking into consideration a behavior of a vehicle or a position of a camera. By subjecting a calculated camera motion to a filtering process, an error which occurs in the camera motion calculation can be reduced.

For example, Patent Publication 3 and Nonpatent Publication 3 propose a method of calculating a camera motion using a search-like technique, in which the camera motion is limited to three parameters, i.e., translation and rotation on a plane, and a geometric constraint expression between corresponding points and the camera motion and an optical constraint expression relevant to values of pixels between small regions in the vicinity of corresponding points, are used. By placing a limitation on a camera motion to reduce the number of unknown parameters, it is possible to reduce an error in camera motion calculation.

For example, Nonpatent Publication 4 proposes a method of calculating a camera motion, in which unknown parameters which are required to calculate a camera motion from corresponding points are divided into two groups which are calculated in two respective stages relating to rotation or translation, whereby the number of unknown parameters to be calculated in one stage is reduced so that an error in camera motion calculation is reduced.

(Patent Publication 1) International Publication WO97/35161

(Patent Publication 2) Japanese Patent Laid-Open Publication No. 2001-266160

(Patent Publication 3) Japanese National Phase PCT Laid-Open Publication No. 2003-515827

(Nonpatent Publication 1) "A computer algorithm for reconstructing a scene from two projections.", H. C. Longuet-Higgins, Nature, 293:133-135, September 1981

(Nonpatent Publication 2) "Gazorikai [Image Understanding]" Kenichi Kanetani, Morikita Shuppan, 1990

(Nonpatent Publication 3) "A Robust Method for Computing Vehicle Ego-motion", G. P. Stein, O. Mano and A. Shashua, IEEE Intelligent Vehicles Symposium (IV2000), October 2000

(Nonpatent Publication 4) "Recovery of Ego-Motion Using Image Stabilization", M. Irani, B. Rousso and S. Peleg, ICVPR, pp 454-460, March, 1994

DISCLOSURE OF INVENTION (Problems to be Solved by the Invention)

However, the above-described conventional techniques have the following respective problems.

In the method of calculating a camera motion from corresponding points the number of which is reduced by providing a constraint condition, it is necessary to extract corresponding points which satisfy the particular constraint condition from a number of corresponding points. However, it is difficult to eliminate an error which occurs in the process of extracting the corresponding points. When a camera motion is calculated from the erroneously extracted corresponding points, a large error occurs in the camera motion (another problem). For example, in the Kanetani's method (Nonpatent Publication 2), a camera motion can be calculated from four or more corresponding points on a plane, however, it is necessary to extract corresponding static points present on the same plane from a plurality of corresponding points in images. However, when this method is applied to images captured by a camera mounted on a mobile body, it is difficult to extract corresponding static points present on the same plane without an error. Therefore, an error in a camera motion is increased due to an error in the process of extracting corresponding points (another problem).

A filtering process is effective as a technique of reducing an influence of an error contained in a result of calculation of a camera motion. However, the filtering process works only when a camera motion and a cause of an error follow a previously assumed model. For example, when a vehicle runs at low speed, an influence of external disturbance, such as unevenness, a bump or the like on road surface, which is difficult to predict, is increased. In this case, it is difficult to design a filter itself. Therefore, when a parameter of a filter is not appropriate, an error is conversely increased.

In the method of reducing the number of unknown parameters, when an actual camera motion is approximated by a relational expression having the reduced number of unknown parameters, a motion can be calculated with a small error. However, when an actual camera motion deviates from the relational expression having the reduced number of unknown parameters, a large error occurs. For example, in the Stein et al. method (Patent Publication 3 and Nonpatent Publication 3), only a total of three parameters, i.e., two parameters for translation on a plane and one parameter for rotation on the plane, are calculated, assuming that a camera is moved only on the particular plane. Therefore, when a camera is inclined or a road surface is not a plane, a large error occurs in a camera motion.

The method of calculating unknown parameters in two stages is effective when appropriate unknown parameter(s) are selected in each stage. However, the parameter selection is not appropriate, a large error occurs in estimation in each stage as in the method of reducing the number of unknown parameters. For example, in the Irani et al. method (Nonpatent Publication 4), unknown parameters are divided into two stages, i.e., rotation and translation. Therefore, for example, if unknown parameters are contained to a nonnegligible extent in both rotation and translation, estimation may not be correctly achieved in each stage.

The present invention is provided to solve the above-described problems. An object of the present invention is to provide a technique of obtaining a motion of a mobile body on which a camera is mounted, using images captured by the camera, in which the mobile body motion can be calculated with high accuracy using corresponding points (optical flow) even if corresponding points contain large errors.

(Means for Solving the Problems)

According to the present invention, a motion of a mobile body on which a camera is mounted is obtained using images of a surrounding of the mobile body captured by the camera. To achieve this, a plurality of corresponding points are obtained from two camera images captured at different capturing times, and assuming a predetermined plane in the camera image, a first motion of the mobile body is obtained using the corresponding points, and a second motion of the mobile body is obtained using the first motion and the corresponding points.

According to the present invention, when the first motion is obtained, the predetermined plane is assumed and a constraint condition that a portion of the corresponding points are present on the predetermined plane is given. Therefore, the number of unknown parameters can be reduced, and the first motion with respect to the plane, which is rough but does not contain a large error, can be obtained. By using the first motion, the second motion can be obtained, which contains a small error even when, for example, the plane is actually inclined.

The first motion is preferably calculated as follows. Among the corresponding points, q (where q is an integer of two or more) partial corresponding point sets each composed of m (where m is an integer of 3 or more) corresponding points are selected. From each of the selected q partial corresponding point sets, a candidate for the motion of the mobile body is calculated using a plane expression indicating a plane. The q calculated motion candidates are evaluated using a predetermined evaluation technique. Based on a result of the evaluation, the first motion is specified.

As a result, it is possible to calculate the first motion of the mobile body, which contains a small error, without being influenced by a large error (like an abnormal value) contained in corresponding points.

The second motion is preferably calculated using a search technique, in which the corresponding points are evaluated where the first motion is used as an initial value. Thereby, the second motion of the mobile body can be calculated with higher accuracy.

(Effects of the Invention)

According to the present invention, a two-stage motion calculation step is provided, in which a first motion is calculated on an assumed plane and a second motion is calculated using the first motion. Therefore, for example, even when a mobile body and a road surface are inclined, a motion of the mobile body can be calculated with high accuracy.

BEST MODE FOR CARRYING OUT THE INVENTION

Figure 1:
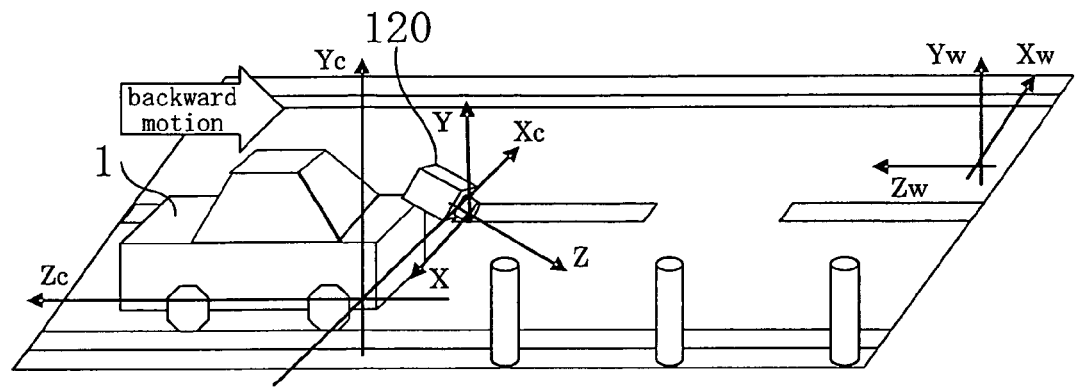
FIG. 1 is a diagram showing a situation of a first embodiment of the present invention.

According to a first aspect of the present invention, a method of obtaining a motion of a mobile body on which a camera is mounted, using images of a surrounding of the mobile body captured by the camera, is provided. The method comprises: a corresponding point calculation step of obtaining a plurality of corresponding points from two of the images having different capturing times; a first motion calculation step of obtaining a first motion indicating the motion of the mobile body using the plurality of corresponding points, assuming a predetermined plane in the images; and a second motion calculation step of obtaining a second motion indicating the motion of the mobile body using the first motion and the plurality of corresponding points.

According to a second aspect of the present invention, the mobile body motion calculation method of the first aspect is provided, in which the plane is a road surface, a ceiling surface, or a wall surface.

According to a third aspect of the present invention, the mobile body motion calculation method of the first aspect is provided, in which, in the first motion calculation step, the first motion is calculated using three of the corresponding points.

According to a fourth aspect of the present invention, the mobile body motion calculation method of the first aspect is provided, in which the first motion calculation step comprises a step of updating a plane expression defining the plane using the first or second motion which has been previously obtained.

According to a fifth aspect of the present invention, the mobile body motion calculation method of the first aspect is provided, in which the first motion calculation step comprises: a first step of selecting q (where q is an integer of two or more) partial corresponding point sets each composed of m (where m is an integer of 3 or more) corresponding points from the plurality of corresponding points; a second step of calculating a candidate for the motion of the mobile body from each of the q partial corresponding point sets selected in the first step with a plane expression defining the plane; and a third step of evaluating the q motion candidates calculated in the second step with a predetermined evaluation technique, and based on a result of the evaluation, specifying the first motion.

According to a sixth aspect of the present invention, the mobile body motion calculation method of the fifth aspect is provided, in which the first motion calculation step comprises a step of calculating a ratio of corresponding static point(s) (corresponding static point ratio) using the plurality of corresponding points and the first or second motion which has been previously obtained; and in the third step, the calculated corresponding static point ratio is used for evaluation to specify the first motion.

According to a seventh aspect of the present invention, the mobile body motion calculation method of the fifth aspect is provided, in which the first motion calculation step comprises a step of obtaining a predicted value of the motion of the mobile body from the first or second motion which has been previously obtained, and in the third step, the first motion is specified, taking the predicted value into consideration.

According to an eighth aspect of the present invention, the mobile body motion calculation method of the first aspect is provided, in which, in the second motion calculation step, the second motion is calculated using a search technique, in which the plurality of corresponding points are evaluated where the first motion is used as an initial value.

According to a ninth aspect of the present invention, the mobile body motion calculation method of the eighth aspect is provided, in which, in the second motion calculation step, the evaluation is performed using the corresponding static point ratio which is the ratio of the corresponding static points.

According to a tenth aspect of the present invention, the mobile body motion calculation method of the fifth aspect is provided, in which the mobile body is a vehicle; and in the second motion calculation step, the partial corresponding point corresponding to the first motion and the plane expression indicating the plane are used instead of the first motion, and the second motion is obtained using a search technique, in which the plurality of corresponding points are evaluated while inclining the plane around a center of an axle near the camera where the plane expression is used as an initial value.

According to an eleventh aspect of the present invention, the mobile body motion calculation method of the first aspect is provided, in which the mobile body has a non-steered wheel whose axle direction is fixed; and in the first and second motion calculation steps, a vertical axis of a coordinate system for representing the motion of the mobile body is placed perpendicular to a straight line including the axle of the non-steered wheel, and a motion on a road surface of the mobile body is obtained as a circular arc movement around the vertical axis.

According to a twelfth aspect of the present invention, the mobile body motion calculation method of the eleventh aspect is provided, in which the vertical axis is placed passing through a central position of the non-steered wheel.

According to a thirteenth aspect of the present invention, an apparatus of obtaining a motion of a mobile body on which a camera is mounted, using images of a surrounding of the mobile body captured by the camera, is provided. The apparatus comprises: a corresponding point calculation section of obtaining a plurality of corresponding points from two of the images having different capturing times; a first motion calculation section of obtaining a first motion indicating the motion of the mobile body using the plurality of corresponding points obtained by the corresponding point calculation section, assuming a predetermined plane in the images; and a second motion calculation section of obtaining a second motion indicating the motion of the mobile body using the first motion obtained by the first motion calculation section and the plurality of corresponding points.

According to a fourteenth aspect of the present invention, a navigation system comprising a navigation apparatus having a positional information obtaining section of obtaining positional information of a mobile body, and the mobile body motion calculation apparatus of the thirteenth aspect, is provided, in which a current location of the mobile body is obtained based on the positional information obtained by the positional information obtaining section and a motion of the mobile body obtained by the mobile body motion calculation apparatus.

Hereinafter, embodiments of the present invention will be described with reference to the accompanying drawings.

First Embodiment

In a first embodiment of the present invention, a vehicle on which a camera is mounted is employed as an example of a mobile body, and a motion of the vehicle is obtained using images of a rear view behind the vehicle which are captured by the camera.

FIG. 1 is a diagram showing a situation in the first embodiment. As shown in FIG. 1, a vehicle 1 (mobile body) is provided with a camera 120 which is mounted at a rear portion thereof and is used to capture images of a rear surrounding thereof. The camera 120 captures images of the rear surrounding of the vehicle and outputs a sequence of images.

Figure 2:
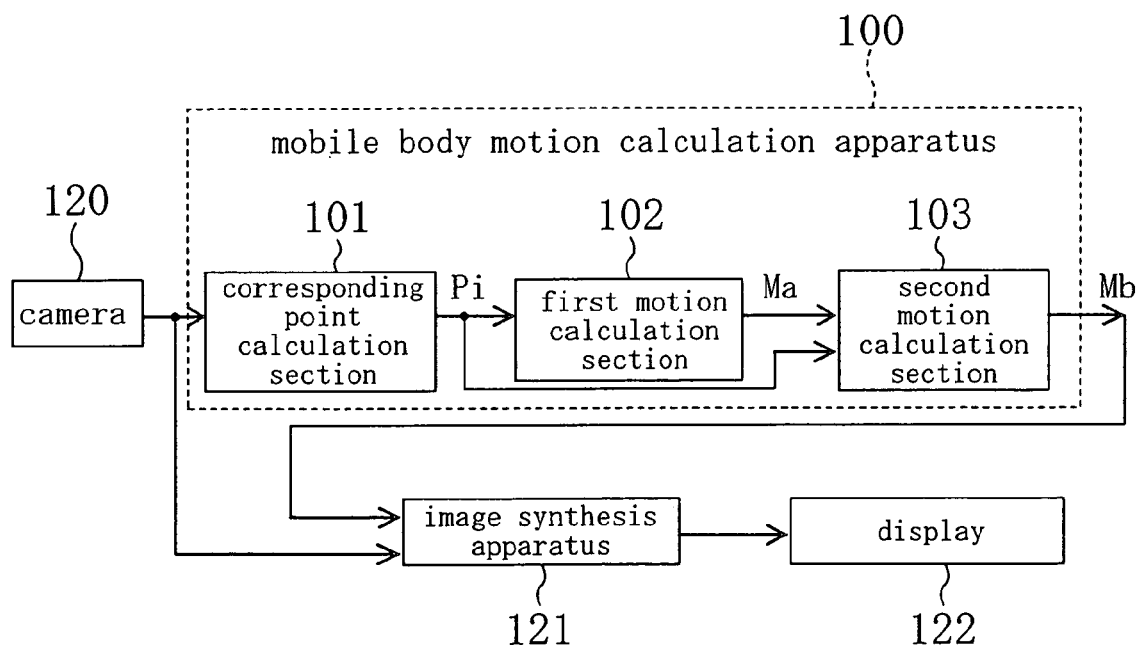
FIG. 2 is a block diagram showing a structure of the first embodiment of the present invention.

FIG. 2 is a block diagram showing a structure including a mobile body motion calculation apparatus of the first embodiment. In FIG. 2, 100 indicates a mobile body motion calculation apparatus which calculates a motion of the vehicle 1 from the images captured by the camera 120; 121 indicates an image synthesis apparatus which generates a synthesized image in which the image captured by the camera 120 is synthesized with information about the motion of the vehicle 1 obtained by the mobile body motion calculation apparatus 100; and 122 indicates a display which displays the synthesized image generated by the image synthesis apparatus 121.

The mobile body motion calculation apparatus 100 comprises: a corresponding point calculation section 101 which obtains a plurality of corresponding points (optical flow vectors) between two consecutive images output from the camera 120; a first motion calculation section 102 which obtains a first motion Ma indicating a motion of the vehicle 1 using a plurality of corresponding points output from the corresponding point calculation section 101, assuming a plane; and a second motion calculation section 103 which obtains a second motion Mb indicating a motion of the vehicle 1 using a plurality of corresponding points output from the corresponding point calculation section 101 and the first motion Ma output from the first motion calculation section 102.

The mobile body motion calculation apparatus 100, the image synthesis apparatus 121 and the display 122 of FIG. 2 are, for example, provided in the vehicle 1, or alternatively, may be provided in a place different from the vehicle 1.

Figure 3:
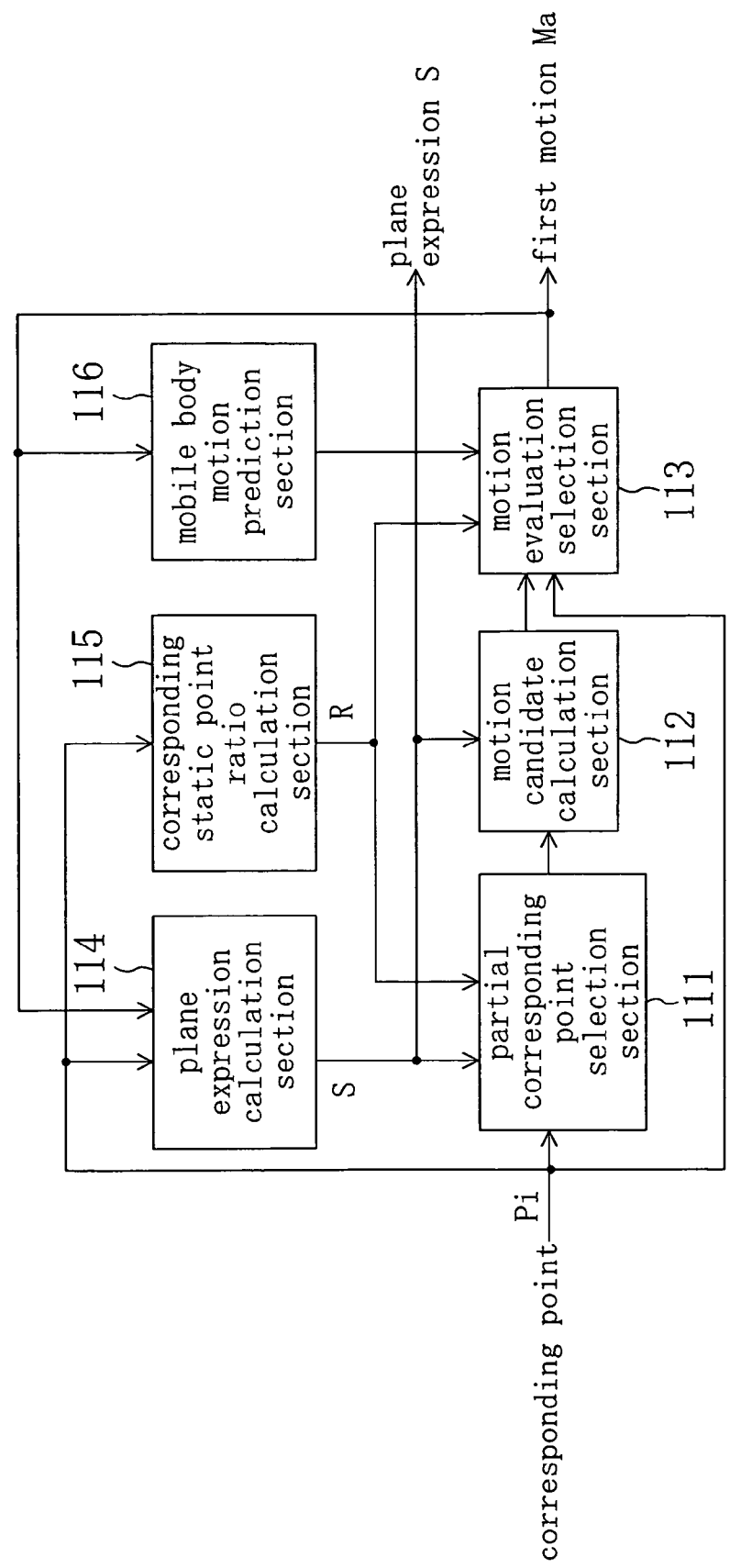
FIG. 3 is a block diagram showing a detailed structure of a first motion calculation section in FIG. 2.

FIG. 3 is a block diagram showing a detailed structure of the first motion calculation section 102 in the mobile body motion calculation apparatus 100 of FIG. 2. In FIG. 3, 111 indicates a partial corresponding point selection section which selects a plurality of partial corresponding point sets each composed of a predetermined number of corresponding points from the plurality of corresponding points output from the corresponding point calculation section 101; 112 indicates a motion candidate calculation section which calculates a candidate for a motion of the vehicle 1 from each partial corresponding point set selected by the partial corresponding point selection section 111; and 113 indicates a motion evaluation selection section which evaluates the motion candidates calculated by the motion candidate calculation section 112 using a predetermined evaluation technique, and based on a result of the evaluation, specifies the first motion Ma.

114 indicates a plane expression calculation section which outputs a plane expression representing a predetermined plane which is assumed when the first motion Ma is calculated; 115 indicates a corresponding static point ratio calculation section which outputs a corresponding static point ratio R which is a ratio of corresponding static point(s); and 116 indicates a mobile body motion prediction section which obtains a predicted value of a mobile body motion.

Here, a description will be given of, for example, when the vehicle 1 moves backward in the situation of FIG. 1.

In FIG. 1, it is assumed that a world coordinate system (Xw, Yw, Zw) is static in three-dimensional space, while a vehicle coordinate system (Xc,Yc,Zc) and a viewpoint coordinate system (X, Y, Z) are fixed to the vehicle 1. A relationship between coordinate values (x, y, z) in the viewpoint coordinate system and coordinate values (xc, yc, zc) in the vehicle coordinate system can be represented by:

$$\begin{pmatrix} x_c \\ y_c \\ z_c \\ 1 \end{pmatrix} = C \begin{pmatrix} x \\ y \\ z \\ 1 \end{pmatrix}, C = \begin{pmatrix} c_{00} & c_{01} & c_{02} & c_{03} \\ c_{10} & c_{11} & c_{12} & c_{13} \\ c_{20} & c_{21} & c_{22} & c_{23} \\ 0 & 0 & 0 & 1 \end{pmatrix} \quad \text{(Expression 1)}$$

where a matrix C represents a positional relationship between the coordinate systems.

When a point static with respect to the world coordinate system is shifted by a motion Mc of a vehicle in the vehicle coordinate system from the coordinate values (xc, yc, zc) to (xc', yc', zc') of the vehicle coordinate system, a relational expression (Expression 2) is established. Further, in this case, if it is assumed that the coordinate values of the same point in the viewpoint coordinate system are shifted from (x, y, z) to (x', y', z'), a relational expression (Expression 3) is established where a motion of the viewpoint coordinate system is represented by M. Therefore, a relational expression (Expression 4) is established between the motion Mc of the vehicle 1 and the motion M of the camera 120.

(Expression 2)
$$\begin{pmatrix} x'_c \\ y'_c \\ z'_c \\ 1 \end{pmatrix} = M_c \begin{pmatrix} x \\ y \\ z \\ 1 \end{pmatrix}$$

(Expression 3)
$$\begin{pmatrix} x' \\ y' \\ z' \\ 1 \end{pmatrix} = M \begin{pmatrix} x \\ y \\ z \\ 1 \end{pmatrix}, \quad M = \begin{pmatrix} r_{00} & r_{01} & r_{02} & t_X \\ r_{10} & r_{11} & r_{12} & t_Y \\ r_{20} & r_{21} & r_{22} & t_Z \\ 0 & 0 & 0 & 1 \end{pmatrix}$$

$$M_c = CMC^{-1}$$

Accordingly, when C indicating a positional relationship between the vehicle coordinate system and the viewpoint coordinate system is known, the motion Mc of the vehicle 1 with reference to the vehicle coordinate system can be obtained by calculating the motion M of the camera 120 with reference to the viewpoint coordinate system and converting the motion M using (Expression 4). When a relative position between the camera 120 and the vehicle 1 is fixed, the motion of the camera 120 and the motion of the vehicle 1 (mobile body motion) can be uniquely converted to each other, and are not herein distinguished from each other unless otherwise specified.

Figure 4:
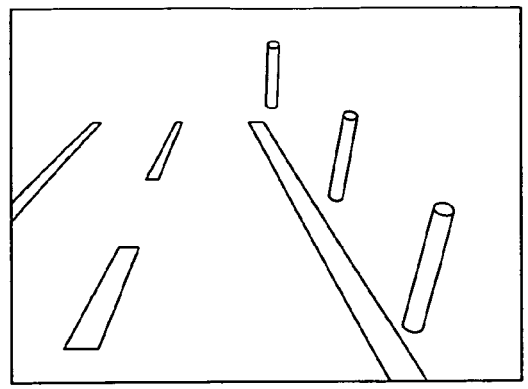
FIGS. 4(a) and 4(b) are diagrams showing exemplary images captured in the situation of FIG. 1.
FIG. 4(c) is a diagram showing corresponding points in the images.
FIG. 4(d) is a diagram showing road surface plane range in the images.
Figure 4:
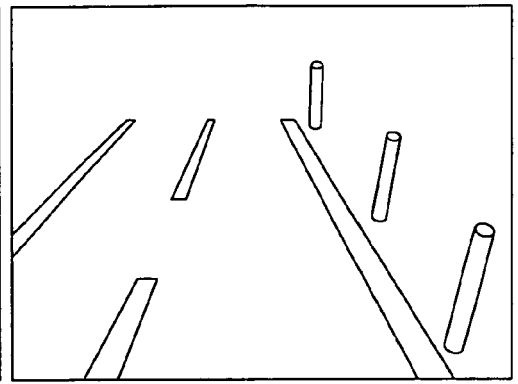
Figure 4:
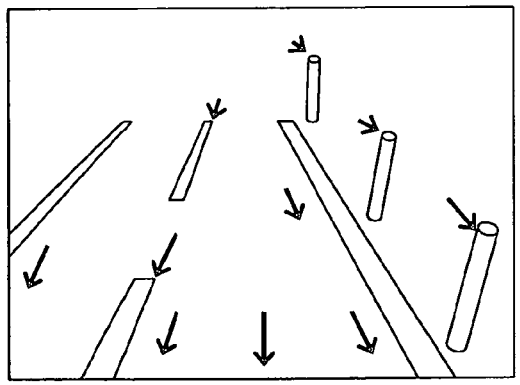
Figure 4:
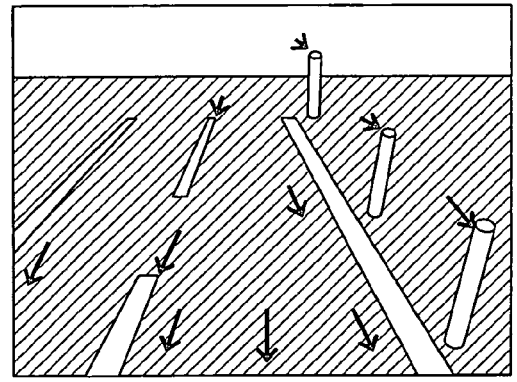

FIGS. 4(*a*) and 4(*b*) show a sequence of images output from the camera 120 when the vehicle 1 moves backward in the situation of FIG. 1. FIG. 4(*a*) shows an image captured at time t−1, while FIG. 4(*b*) shows an image captured at time t. FIG. 4(*c*) is a diagram showing corresponding points (arrows in the figure) which indicate motions of the same points between the two images at time t−1 and time t.

Figure 5:
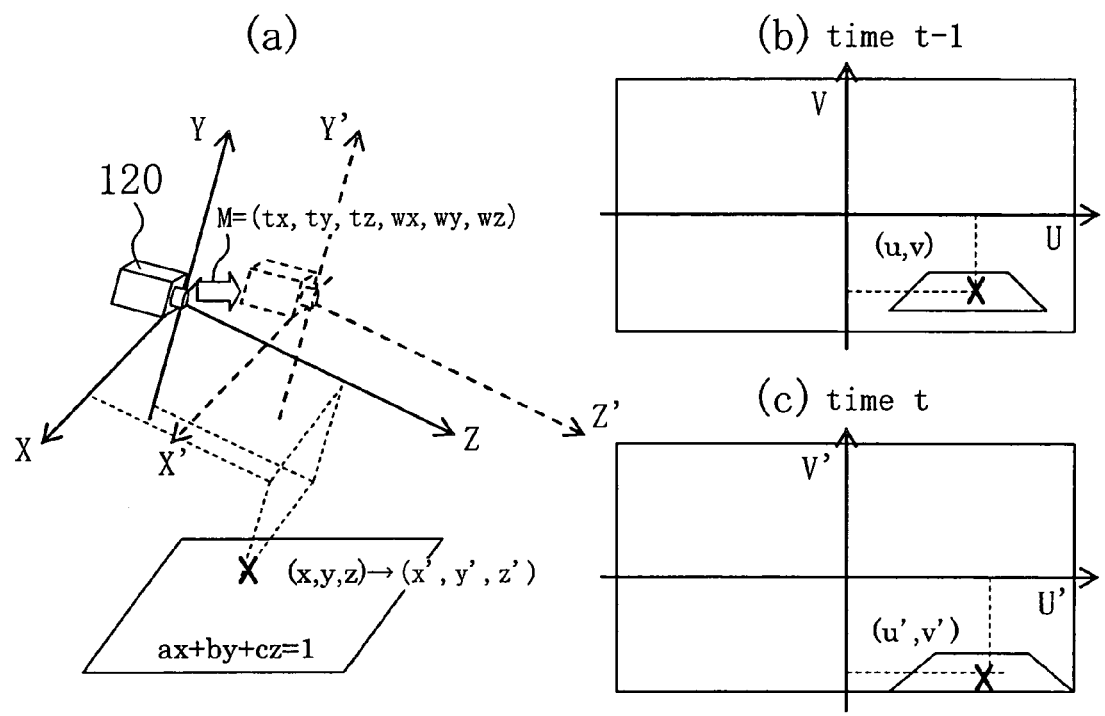
FIG. 5 is a diagram showing a relationship between a camera motion and a change in images.

FIG. 5 is a diagram showing a relationship between a three-dimensional motion of the camera 120 and a change in images. As shown in FIG. 5(*a*), it is assumed that when the camera 120 is moved by the motion M between time t−1 and time t, a static point X in the world coordinate system is shifted from coordinate values (x, y, z) to (x', y', z') of the viewpoint coordinate system. In this case, (Expression 3) is established among the coordinate values (x, y, z), (x', y', z') and the camera motion M. FIGS. 5(*b*) and 5(*c*) show images at times t−1 and t, respectively. At time t−1, the point X at the viewpoint coordinates (x, y, z) corresponds to image coordinates (u, v). At time t, the point X at the viewpoint coordinates (x', y', z') corresponds to image coordinates (u',v'). In this case, from the relationship between (u, v) and (x, y, z), the relationship between (u',v') and (x', y', z'), and (Expression 3), a relational expression (Expression 5) is established. In (Expression 5), f represents a focal length of the camera.

(Expression 5)
$$u = f\frac{x}{z}, \quad v = f\frac{y}{z}$$

$$u' = f\frac{x'}{z'} = f\frac{r_{00}x + r_{01}y + r_{02}z + t_X}{r_{20}x + r_{21}y + r_{22}z + t_Z},$$

$$v' = f\frac{y'}{z'} = f\frac{r_{10}x + r_{11}y + r_{12}z + t_Y}{r_{20}x + r_{21}y + r_{22}z + t_Z}$$

In this case, when the static point X (x, y, z) is present on a plane represented by a plane expression (Expression 6) and the motion M (tx, ty, tz, wx, wy, wz) of the camera 120 is sufficiently small so that (Expression 7) is established, a relational expression (Expression 8) is established between the image coordinates (u, v) and (u', v') of the point X and the camera motion M. Further, (Expression 8) is simplified, taking the components of the camera motion M into consideration, thereby obtaining (Expression 9). For each set of corresponding points, two expressions of (Expression 9) are established. Therefore, when the plane expression and the focal length f of the camera 120 are known and three or more independent (not on the same straight line) sets of corresponding points (u, v) and (u',v') are given, the six variables (tx,ty,tz,wx,wy,wz) of the motion M of the camera 120 can be calculated.

(Expression 6)
$$ax + by + cz = 1$$

(Expression 7)
$$M = \begin{pmatrix} r_{00} & r_{01} & r_{02} & t_X \\ r_{10} & r_{11} & r_{12} & t_Y \\ r_{20} & r_{21} & r_{22} & t_Z \\ 0 & 0 & 0 & 1 \end{pmatrix} \cong \begin{pmatrix} 1 & wz & -wy & t_X \\ -wz & 1 & wx & t_Y \\ wy & -wx & 1 & t_Z \\ 0 & 0 & 0 & 0 \end{pmatrix}$$

(Expression 8)
$$u' = \frac{(1 + at_X)u + (wz + bt_X)v + (-wy + ct_X)f}{\frac{1}{f}(wy + at_Z)u + \frac{1}{f}(-wx + bt_Z)v + (1 + ct_Z)}$$

$$v' = \frac{(-wz + at_Y)u + (1 + bt_Y)v + (wx + ct_Y)f}{\frac{1}{f}(wy + at_Z)u + \frac{1}{f}(-wx + bt_Z)v + (1 + ct_Z)}$$

(Expression 9)
$$\begin{pmatrix} \frac{vu'}{f} & -f - \frac{uu'}{f} & au + bv + cf & 0 & \left(-\frac{au}{f} - \frac{bv}{f} - c\right)u' \\ f + \frac{vv'}{f} & -\frac{uv'}{f} - u & 0 & au + bv + cf & \left(-\frac{au}{f} - \frac{bv}{f} - c\right)v' \end{pmatrix} \begin{pmatrix} wx \\ wy \\ wy \\ t_X \\ t_Y \\ t_Z \end{pmatrix} = \begin{pmatrix} u' - u \\ v' - v \end{pmatrix}$$

Hereinafter, a description will be given of, for example, when a camera motion M between time t−1 and time t is calculated. Note that, as described above, a motion of a camera and a motion of a mobile body can be uniquely converted to each other using (Expression 4), and therefore, if the camera motion can be calculated, the motion of the mobile body is substantially calculated.

It is here assumed that the vehicle coordinate system (Xc, Yc, Zc) and the viewpoint coordinate system (X, Y, Z) are arranged as shown in FIG. 1 and that C indicating a positional relationship between the vehicle coordinate system and the viewpoint coordinate system is previously measured. It is further assumed that the focal length f of the camera 120 is previously obtained and a value thereof is obtained by multiplying a focal length in a real coordinate system by a coefficient of conversion between real coordinates and image coordinates.

The corresponding point calculation section 101 temporarily stores a sequence of images output by the camera 120, and detects n corresponding points (where n is an integer of 2 or more) from two consecutive images of the image sequence. Here, for coordinates (ui, vi) of n points (i=1, . . . , n) on an image at time t−1, respective corresponding coordinates (ui', vi') (i=1, . . . , n) on an image at time t are detected. Information about the n corresponding points thus detected are represented by Pi(ui, vi, ui', vi') (i=1, . . . , n). The number n of corresponding points is assumed to be predetermined.

Note that two images from which corresponding points are detected are not necessarily consecutive and only need to have different capturing times.

The corresponding point detection may be performed using, for example, a corresponding point search method proposed by Kanade, Lucas and Tomasi (see, for example, "Detection and Tracking of Point Features", Carlo Tomasi and Takeo Kanade, Carnegie Mellon University Technical Report, CMU-CS-91-132, April 1991). This method is widly known and will not be explained.

The first motion calculation section 102 calculates a first motion Ma of the vehicle 1 using n corresponding points Pi(ui, vi, ui', vi') (i=1, . . . , n) detected by the corresponding point calculation section 101. Hereinafter, an operation of each processing means constituting the first motion calculation section 102 will be described.

The plane expression calculation section 114 here outputs a predetermined plane expression. The plane expression here used is obtained by approximating a road surface in the situation of FIG. 1 as a plane. For example, assuming that the vehicle is static, an expression of a horizontal and flat road surface plane is previously measured. In this case, the plane expression calculation section 114 outputs a parameter S(a, b, c) of the previously measured plane expression (Expression 6). Note that the plane expression calculation section 114 also has a function of updating the plane expression as described below.

The corresponding static point ratio calculation section 115 outputs a corresponding static point ratio R. Here, the corresponding static point ratio preferably represents a ratio of corresponding point(s) which are static with respect to the world coordinate system and have a correct correspondence relationship, among the n corresponding points calculated by the corresponding point calculation section 101. Here, the correct correspondence relationship in relation to a corresponding point means that an error in coordinate values of the corresponding point is less than or equal to a predetermined threshold. Note that it is difficult to obtain the corresponding static point ratio R in advance in a real-time on-line process. Actually, the corresponding static point ratio R is assumed to be a predicted value of the above-described ratio.

Here, the corresponding static point ratio calculation section 115 outputs a predetermined value (e.g., 0.5) as the corresponding static point ratio R. The corresponding static point ratio R of 0.5 means that it is predicted "50% of n corresponding points calculated by the corresponding point calculation section 101 are corresponding point(s) which are static and have a correct correspondence relationship". For example, a corresponding static point ratio is previously measured a plurality of times in a traveling situation similar to that of FIG. 1, and a minimum value of the measured ratios may be used as the predetermined value. Note that the corresponding static point ratio calculation section 115 also has a function of newly calculating the corresponding static point ratio R as described below.

The mobile body motion prediction section 116 has a function of obtaining a predicted value of the motion of the vehicle 1. Here, however, such a function is assumed not to be particularly performed.

The partial corresponding point selection section 111 selects q partial corresponding point sets each composed of in corresponding points using the n corresponding points Pi output from the corresponding point calculation section 101, the plane expression S output from the plane expression calculation section 114, and the corresponding static point ratio R output from the corresponding static point ratio calculation section 115. Here, the number in of corresponding points constituting a partial corresponding point is the number of corresponding points which are required for calculation of a motion of a mobile body. At least three corresponding points are required for calculation of a camera motion using (Expression 9). Therefore, it is here assumed that m=3, though m may be a value of more than 3.

The partial corresponding point selection section 111 initially calculates the number q of partial corresponding point sets. The larger the value of the number q of partial corresponding point sets, the longer the time required for processing in the first motion calculation section 102. Conversely, the smaller the number q, the shorter the processing time. Therefore, for example, when the processing time is constrained, q may be determined based on the upper limit thereof.

It is here assumed that the number q of partial corresponding point sets is obtained by a relational expression:

$$q = \frac{\log(1-z)}{\log(1-Rr^m)} \quad \text{(Expression 10)}$$

where Rr represents a road surface corresponding static point ratio and z is a guarantee rate.

The road surface corresponding static point ratio Rr is a probability that each corresponding point selected as a partial corresponding point is present on a road surface, is static with respect to the world coordinate system, and has a correct correspondence relationship. Therefore, when there is not a correlation between a probability Rs that a corresponding point is present on a road surface and the corresponding static point ratio R of the corresponding point, the road surface corresponding static point ratio Rr is obtained by multiplying the probability Rs that the corresponding point is present on a road surface by the corresponding static point ratio R. If it is possible to correctly select a corresponding point which is present on a road surface and the corresponding static point ratio of the selected corresponding point is R, the road surface corresponding point ratio Rr of the selected corresponding point is equal to the corresponding static point ratio R. Here, for example, Rr of 0.3 is used as a predetermined value. As the predetermined value, for example, a value may be used which is obtained by previously measuring the probability Rs that a selected corresponding point is present on a road surface in a traveling situation similar to that of FIG. 1 and multiplying the Rs by the corresponding static point ratio R.

The guarantee rate z is a rate at which it is statistically guaranteed that there is at least one partial corresponding point set which is composed of all (m) correct corresponding points which are static and present on a road surface, among the q partial corresponding point set. Here, for example, z of 0.999 is used as a predetermined value. In other words, q partial corresponding point sets need to be selected in order to guarantee, with a guarantee rate of z, that there is at least one partial corresponding point set composed of correct corresponding points present on a road surface.

When q and Rr are constant in (Expression 10), the guarantee rate z increases with a decrease in the number m of corresponding points constituting a partial corresponding point. When z and Rr are constant, q decreases with a decrease in m. Therefore, the smaller the number m of corresponding points, the shorter the processing time, i.e., the higher the probability that there is at least one partial corresponding point set composed of correct corresponding points present on a road surface. In addition to this, calculation of (Expression 9) requires three or more corresponding points. Therefore, the most desirable m is 3.

Next, the partial corresponding point selection section 111 selects and outputs q partial corresponding point sets composed of m different corresponding points from n corresponding points using the calculated number q of sets. The partial corresponding point may be selected randomly from all the n corresponding points or randomly from corresponding points satisfying a specific condition which have been extracted. Here, the latter is employed. Specifically, corresponding points are extracted within an iamge region in which the plane expression S can be present, and from the extracted corresponding points, q partial corresponding point sets composed of m different corresponding points are randomly selected and output. For example, in FIG. 4(d), it is indicated that a region of the image in which the plane S can be present is limited to a hatched region lower than a horizontal line. In this method, the road surface corresponding static point ratio Rr when corresponding points are present in the hatched region are extracted before partial corresponding points are selected, has a higher value that that of the road surface corresponding static point ratio Rr when partial corresponding points are randomly selected from n corresponding points. As a result, the number q of partial corresponding point sets can be reduced.

The motion candidate calculation section 112 calculates q motion candidates respectively from the q partial corresponding point sets selected by the partial corresponding point selection section 111, using the plane expression S.

As described above, when it is assumed that the corresponding points Pi(u, v, u', v') are present on the plane expression S(a, b, c) in an image and the camera motion M is small, the relational expression (Expression 9) is established. In (Expression 9), it is here assumed that the corresponding points and the plane expression are known and the camera motion M is unknown. In this case, if the number of the corresponding points is three or more, the camera motion M can be calculated. Therefore, the motion candidate calculation section 112 calculates q camera motions Mj (j=1, . . . , q) respectively from q partial corresponding point sets composed of three corresponding points, using the relational expression (Expression 9), and outputs the q camera motions Mj as candidates for a motion of the vehicle 1.

The motion evaluation selection section 113 evaluates the q motion candidates (camera motions Mj (j=1, . . . , q)) calculated by the motion candidate calculation section 112 using a predetermined evaluation technique, and based on a result of the evaluation, specifies the first motion Ma. For the evaluation, the n corresponding points Pi output from the corresponding point calculation section 101 and the corresponding static point ratio R output from the corresponding static point ratio calculation section 115, are used. Note that a predicted motion output from the mobile body motion prediction section 116 may be used as described below.

Here, initially, a degree of matching between the camera motions Mj and the n corresponding points Pi is evaluated. Specifically, for each camera motion Mj, n corresponding points (ui, vi, ui', vi') (i=1, . . . , n) are substituted into (Expression 11) to calculate three-dimensional coordinates (xi, yi, zi) of the n corresponding points. Here, (Expression 11) has four independent first-order expressions for four unknown variables, and the corresponding points Pi(ui, vi, ui', vi') calculated from images are considered to have an error. Therefore, the least square method is used to calculate the three-dimensional coordinates (xi, yi, zi).

$$u = f\frac{x}{z}, v = \frac{y}{z} \qquad \text{(Expression 11)}$$

$$u' = f\frac{x + w_Z y - w_Y z + t_X}{w_Y x - w_X y + z + t_Z},$$

$$v' = f\frac{-w_Z x + y + w_X z + t_Y}{w_Y x - w_X y + z + t_Z}$$

Further, the calculated three-dimensional coordinates (xi, yi, zi) and the camera motions Mj are substituted again into (Expression 11) to newly calculate corresponding points (uij, vij, uij', vij'). Here, when the corresponding points Pi(ui, vi, ui', vi') and the camera motions Mj have correct values without an error, Pi(ui, vi, ui', vi') match (uij, vij, uij', vij'). When there is an error, they do not match each other. An average error distance Eji between (ui, vi, ui', vi') and (uij, vij, uij', vij') is calculated from (Expression 12). The value of Eji becomes zero when the camera motion Mj matches the corresponding point Pi, and increases when they do not match each other. Therefore, Eji is used as an evaluation value which is associated with the degree of matching between the camera motion Mj and the corresponding point Pi.

$$Eji = \frac{\sqrt{(ui - uij)^2 + (vi - vij)^2} + \sqrt{(ui' - uij')^2 + (vi' - vij')^2}}{2} \qquad \text{(Expression 12)}$$

Next, among the evaluation values Eji (i=1, . . . , n) of the camera motion Mj with respect to the n corresponding points Pi, an evaluation value having the (n×R)-th best evaluation, i.e., the (n×R)-th smallest value, is selected as an evaluation value Ej of the camera motion Mj.

Among the q camera motions Mj (j=1, . . . , q), a camera motion corresponding to one of the evaluation values Ej (j=1, . . . , q) which has the best evaluation, i.e., the smallest value, is selected as a first motion Ma.

Figure 6:
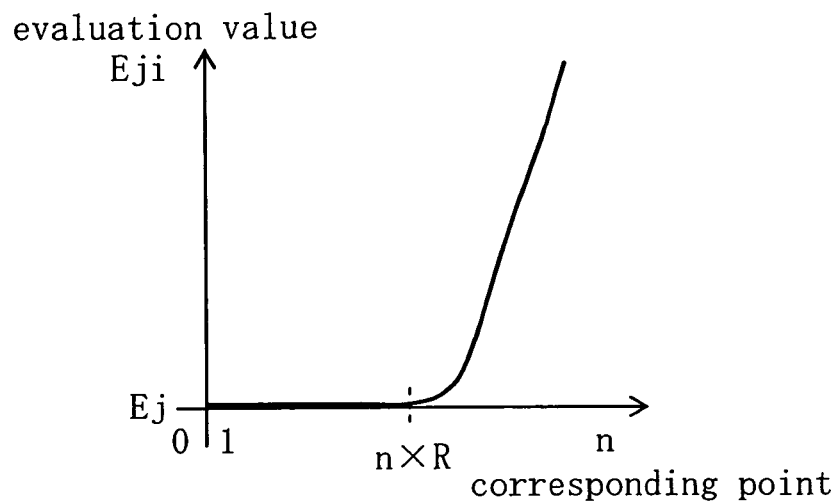
FIG. 6 is a graph conceptually showing a distribution of evaluation values Eji of a motion Mj with respect to each corresponding point.
Figure 6:
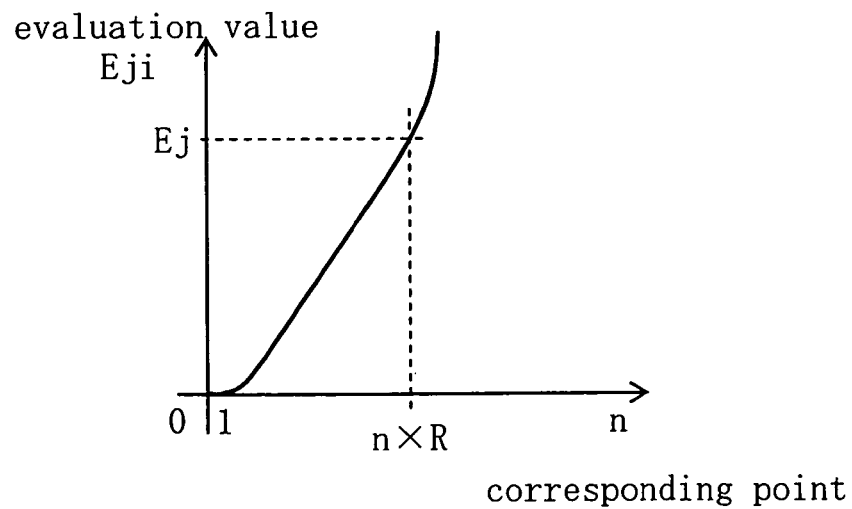

FIG. 6 is a graph conceptually showing a distribution of evaluation values Eji (i=1, . . . , n) of a certain one camera motion Mj with respect to n corresponding points. In FIG. 6, the evaluation values Eji are sorted in ascending order, and the horizontal axis indicates corresponding point numbers (1, . . . , n) after sorting while the vertical axis indicates the evaluation values Eji of the camera motion Mj with respect to respective corresponding points.

It is here assumed that the camera motion Mj is correct and (n×R) of the n corresponding points are correct and static. In this case, ideally as shown in FIG. 6(a), from the first to (n×R)-th smallest evaluation values Eij are zero and the further smallest evaluation values Eij have values which are gradually increased. Therefore, the evaluation value Ej is also zero. However, actually, there is a small error, such as a measurement error in a corresponding point. Therefore, from the first to (n×R)-th smallest evaluation values Eij are not necessarily zero.

On the other hand, when a camera motion Mj is not correct, most of the evaluation values Eji have a large value, so that the evaluation value Ej also has a large value as shown in FIG. 6(b). In other words, when the corresponding static point ratio R is used as a prior condition, a small evaluation value Ej of a camera motion Mj means satisfaction of the prior condition. A camera motion having the smallest evaluation value Ej (i.e., the first motion Ma) means a camera motion which most satisfactorily satisfies the prior condition.

With such an operation, the first motion calculation section 102 calculates and outputs a first motion Ma, which is a motion of the vehicle 1, using the n corresponding points Pi on images at time t−1 and time t.

The second motion calculation section 103 calculates a second motion Mb indicating a motion of the vehicle 1 using the first motion Ma output from the first motion calculation section 102 and the n corresponding points Pi output from the corresponding point calculation section 101. Here, the second motion Mb is calculated using a search method where the first motion Ma is used as an initial value.

Specifically, initially, the first motion Ma (tx, ty, tz, wx, wy, wz) is used as an initial value. The parameters are increased or decreased by respective predetermined minute motions (dtx, dty, dtz, dwx, dwy, dwz), thereby obtaining a plurality of motion candidates. Thus, o (=3^6) motion candidates Mbk (=(tx±dtx, ty±dty, tz±dtz, wx±dwx, wy±dwy, wz±dwz) (k= 1, . . . , o)) are obtained.

Next, as in the motion evaluation selection section 113 of the first motion calculation section 102, evaluation values Ebki (i=1, . . . , n) of n corresponding points are calculated for each of the o motion candidates Mbk. The (n×R)-th smallest evaluation value Ebki is defined as an evaluation value Ebk of a motion candidate Mbk. A motion candidate Mbk having the smallest evaluation value Ebk is selected.

Thereafter, a process similar to that described above is performed using the selected motion candidate Mbk as an initial value. This process is repeatedly performed. When the value is converged or the number of repetitions reaches a certain number, the process is ended. In this case, the second motion calculation section 103 outputs the finally selected motion candidate Mbk as the second motion Mb.

With such an operation, the mobile body motion calculation apparatus 100 calculates the motion of the vehicle 1 between time t−1 and time t. In addition, by repeatedly performing a similar process for an image sequence output from the camera 120, the motion of the vehicle 1 can be continuously calculated.

Figure 7:
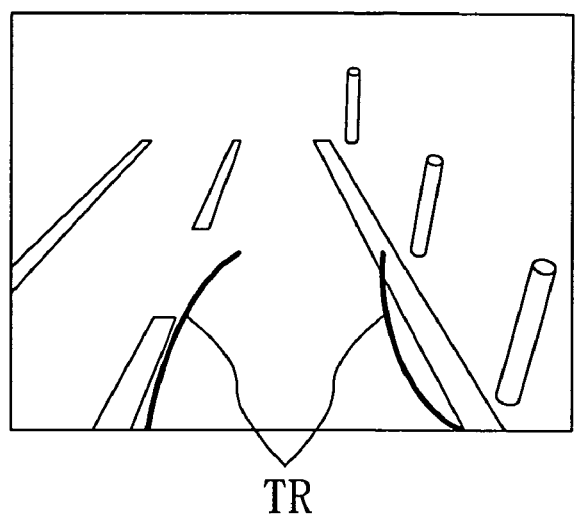
FIG. 7 shows an example of a synthesized image, in which a predicted trajectory corresponding to a calculated motion is superposed.

Thereafter, the image synthesis apparatus 121 receives the images captured by the camera 120 and the second motion Mb output from the mobile body motion calculation apparatus 100, and generates a synthesized image with information about the motion of the vehicle 1. The display 122 displays the synthesized image generated by the image synthesis apparatus 121. FIG. 7 shows an example of the displayed synthesized image, in which a predicted trajectory TR corresponding to the second motion Mb of the vehicle 1 is superposed on an image captured by the camera 120.

<Effects of the First Embodiment>

According to the first embodiment, a motion of a vehicle can be calculated with high accuracy even when, for example, there are many errors in corresponding point search and a large error occurs.

The Kanade, Lucas and Tomasi method mentioned in the description of the corresponding point calculation section 101 is widely known as a corresponding point search method which is excellent in terms of both high accuracy and a less computation amount. However, it can be said that, in such an excellent method, it is substantially impossible to eliminate an error in the corresponding point search from images captured in a situation having no constraints.

Figure 8:
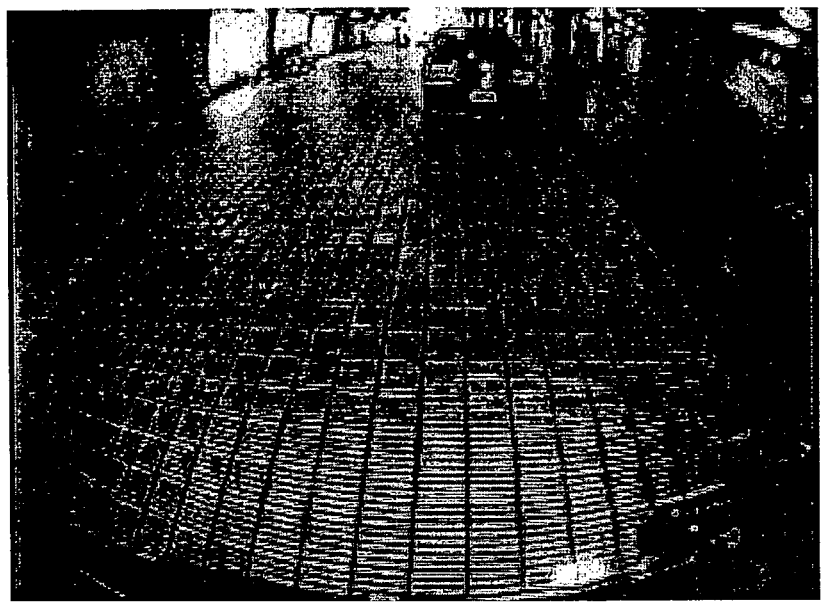
FIG. 8(a) shows an example of an image actually captured by a camera mounted on a vehicle.
FIG. 8(b) is a graph showing a relationship between a moving speed of the vehicle and a corresponding point correct solution ratio in the situation of FIG. 8(a).
Figure 8:
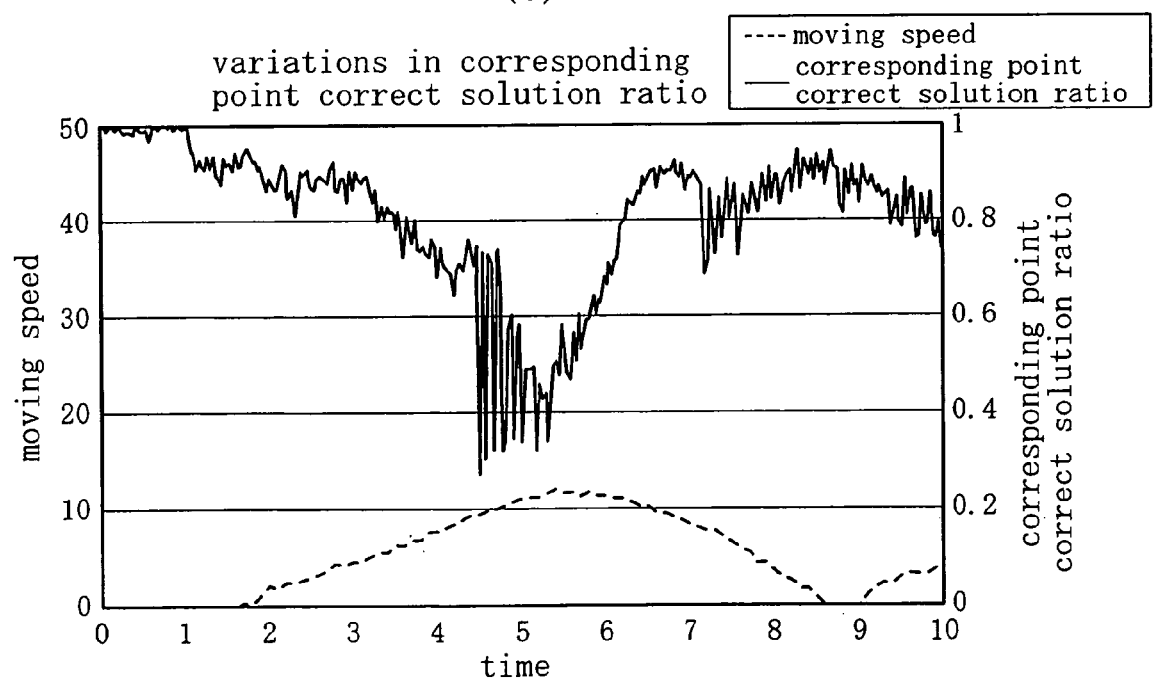

FIG. 8(a) shows an example of an image actually captured by a camera mounted on a rear portion of a vehicle. Moving images captured in a scene of FIG. 8(a) were used to perform a corresponding point search using the above-described technique. FIG. 8(b) is a graph showing a relationship between a correct solution ratio of corresponding points and a moving speed of a vehicle at that time. It is here assumed that a ratio of corresponding point(s) which have an error in the image coordinates which is within one pixel is referred to as a corresponding point correct solution ratio. Note that values of time and moving speed are appropriately scaled in the graph of FIG. 8(b).

As can be seen from FIG. 8(b), when actually captured images are used, a corresponding point correct solution ratio may decrease to about 50% even when using a method which is considered to have high accuracy. There may be a number of corresponding points having a large error (like an abnormal value). The present inventors have confirmed that such a case is not rare according to other experimental results.

The above-described conventional methods do not have a mechanism of eliminating a number of errors. Therefore, for example, when the correct solution ratio of corresponding point search is significantly reduced, high-accuracy motion calculation is no longer expected.

In contrast to this, in the first embodiment, even if the corresponding point correct solution ratio is significantly reduced, the first motion calculation section 102 can calculate the first motion Ma with high accuracy. Specifically, in the case of the method of the first embodiment, if at least one correct partial corresponding point set is included in q partial corresponding point sets, at least one correct motion is included in q motion candidates Mj. Further, by evaluating the q motions Mj using the corresponding static point ratio R corresponding to the correct solution ratio of a corresponding point search and the (n×R)-th best evaluation value among evaluation values with respect to n corresponding points, a correct motion Ma can be calculated.

Further, according to the first embodiment, for example, even when a road surface is inclined, a motion of a vehicle can be calculated with high accuracy.

In the first embodiment, an expression of a horizontal and flat road surface plane which has been measured when a vehicle is in a static state is used as a predetermined plane expression to calculate the first motion Ma. However, when a road surface is inclined on a sloping roadway, a ramp or the like, or when an attitude of a vehicle is changed due to the load of a passenger or burden, or steering, the predetermined plane expression thus previously measured no longer matches a road surface plane on which the vehicle is actually traveling.

Figure 9:
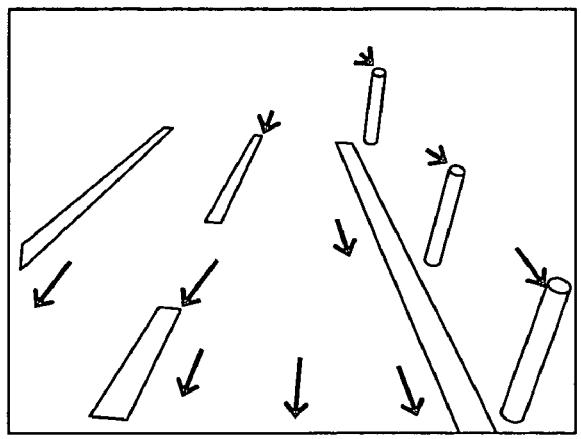
FIG. 9(a) shows an example of an image when a vehicle is inclined.
FIG. 9(b) shows a distribution of evaluation values Eji of a motion Mj with respect to each corresponding point in the situation of FIG. 9(a).

FIG. 9(a) shows an example of an image when a vehicle is inclined. When the vehicle is inclined, a road surface in an image is also inclined. Therefore, the road surface no longer matches the predetermined plane expression previously measured. In this case, even if three corresponding points of a selected partial corresponding point are present on the road surface and the correspondence relationship is correct, a motion Mj calculated using (Expression 9) contains an error. Therefore, as shown in FIG. 9(b), the evaluation values Eji of a motion Mj with respect to n corresponding points are slightly larger than when the plane expression is correct, and the evaluation value Ej is also larger. Therefore, the first motion Ma having the smallest evaluation value contains an error.

Here, when the evaluation value of FIG. 9(b) is obtained, it is difficult to reduce an error even if a conventional technique of eliminating an abnormal value may be employed, a portion of corresponding points having a small evaluation value are extracted, and the least square method is performed using (Expression 9) to calculate a motion.

In contrast to this, in the first embodiment, a second motion Mb is calculated using a search method where a first motion Ma is used as an initial value and the (n×R) smallest evaluation value is used as a reference. In general, when the evaluation function is smooth between the initial value to a true value (or a best value), the true value can be obtained using the search method. The evaluation value used in the first embodiment satisfies the above-described conditions if it is close to the true value. Therefore, for example, even when an actual road surface does not match a predetermined plane expression so that the first motion Ma contains an error, the second motion calculation section 103 can calculate the second motion Mb having a small error.

Validity and effects of assumption of a plane expression in the first embodiment will be described based on a problem which arises in an actual vehicle traveling situation.

The system for monitoring a surrounding of a vehicle using a camera has the following features. Specifically, in order for a driver to be able to monitor a surrounding of a vehicle, typically as shown in FIG. 4, a camera having a wide view angle is mounted so as to capture an image which covers from a road surface near a vehicle to an obstacle above a horizontal line. It can be expected that an image captured by the camera thus mounted covers a road surface in substantially all scenes. Further, even if a road surface is not a continuous plane, a number of objects are present on an extension of the road surface plane. For example, even if a far object near a horizontal line is not actually in contact with a road surface, the object can be assumed to be present on the same plane expression as that which represents the road surface. The present inventors have experimentally confirmed that this is true of many situations. Therefore, it can be said that the method of obtaining a motion using an assumed plane expression representing a road surface is effective for a system for monitoring a surrounding of a vehicle.

Further, when a plane expression is assumed, a motion of a vehicle can be calculated based on three corresponding points using (Expression 9). In contrast to this, when a plane expression is not assumed, at least four corresponding points are required to obtain a motion (or a motion candidate), whereby vehicle motion calculation is likely to be influenced by an error. In contrast to this, by assuming a plane expression as in the first embodiment, an influence of an error can be avoided.

When images captured by a monocular camera are used to calculate a camera motion, an object whose size is already known is required in the images in order to obtain a scaling term. In the first embodiment, by assuming a plane expression, it is possible to calculate a camera motion, taking a scale into consideration, even when there is not an object whose size is already known in images.

Further, by assuming a plane expression, it is possible to calculate a mobile body motion, even when there are other mobile body(s) in images.

Figure 10:
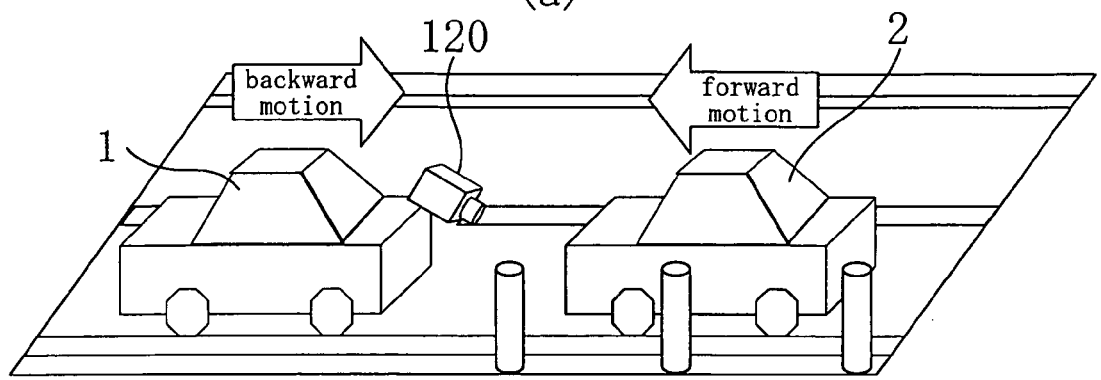
FIG. 10(a) is a diagram showing a situation that there is another moving vehicle behind a vehicle.
FIG. 10(b) shows an example of an image captured in the situation of FIG. 10(a).
Figure 10:
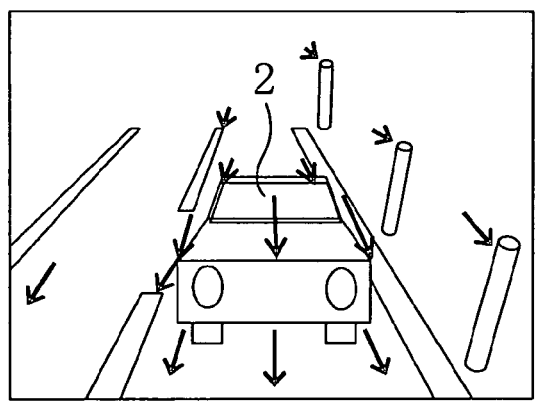

FIG. 10(a) is a diagram showing a situation that there is another moving vehicle 2 behind a vehicle 1. In FIG. 10(a), the vehicle 1 moves backward (to the right in the figure), while the other vehicle 2 moves forward (to the left in the figure). In this case, an image, such as that shown in FIG. 10(b), is captured by a camera 120.

It is here assumed that 50% of corresponding points are calculated on each of a road surface and the other vehicle 2 (assuming that a correspondence relationship does not have an error). When a conventional method is applied to such a situation, there is a possibility that a motion of the vehicle 1 is calculated for each of the road surface and the other vehicle 2. Therefore, a means for discriminating between these two motions is additionally required. If an error occurs in the means for discriminating between the two motions, the motion of the vehicle 1 contains a large error.

In contrast to this, in the first embodiment, the motion of the vehicle 1 is calculated using an assumed plane expression of a road surface. Therefore, in the first motion calculation section 102, a motion Mj of the vehicle 1 which is obtained from corresponding points on the other vehicle 2 which is at a distance from the road surface plane, contains a large error, so that an evaluation value Ej thereof is large. As a result, in the first motion calculation section 102, a motion with respect to the road surface plane which is obtained from corresponding points on the road surface can be selected as a first motion Ma without selecting a motion obtained from corresponding points on the other vehicle 2. Thus, it can be said that the first embodiment provides an effect such that a motion of a mobile body can be correctly calculated even when there is another mobile body in an image.

As described above, by calculating a motion using an assumed plane expression, it is possible to calculate a mobile body motion with high accuracy, avoiding problems which otherwise occur in actual circumstances in which a vehicle travels, such as an error occurring in a corresponding point search process, inclination of a road surface or a vehicle, the presence of another moving object, or the like.

<Updating of Plane Expression>

The plane expression calculation section 114 can also update a plane expression using a first motion Ma which is obtained based on previous images obtained by the first motion calculation section 102.

For example, the plane expression calculation section 114 outputs a predetermined plane expression (a0, b0, c0) at time t=1. The first motion calculation section 102 uses the initial plane expression (a0, b0, c0) to obtain a first motion Ma between at time t=0 and at time=1. Next, at time t=2, the plane expression calculation section 114 uses the first motion Ma obtained between at time t=0 and t=1 to newly calculate and output a plane expression (a1, b1, c1), assuming that a mobile body moves by the first motion Ma with respect to the initial plane expression (a0, b0, c0). Subsequently, by repeating similar processes successively, the plane expression is updating.

Thus, a plane expression is newly calculated from a mobile body motion previously calculated, and is used in the next motion calculation, thereby making it possible to execute motion calculation based on a more correct plane position. Therefore, it is possible to calculate a mobile body motion with high accuracy.

Note that a plane expression may be updated using the second motion Mb instead of the first motion Ma or using both of them.

A plane expression does not have to be updated every time motion calculation is executed. For example, updating of a plane expression may be executed per a predetermined number of times of executing motion calculation, or may be executed when a situation of a road surface or a vehicle is changed.

<Updating of Corresponding Static Point Ratio>

The corresponding static point ratio calculation section 115 can calculate a corresponding static point ratio using a plurality of corresponding points output from the corresponding point calculation section 101 and a first motion Ma calculated by the first motion calculation section 102 based on previous images, instead of outputting of a predetermined corresponding static point ratio.

For example, the corresponding static point calculation ratio section 115 evaluates the first motion Ma calculated by the first motion calculation section 102 with respect to n corresponding points using the above-described (Expression 11) and (Expression 12). Thereafter, a ratio of corresponding point(s) whose evaluation value Ei is smaller than or equal to a predetermined threshold among the n corresponding points is calculated, and is stored as a new corresponding static point ratio. When the next motion calculation is executed, the corresponding static point ratio thus stored is output. Subsequently, by repeating a similar process successively, the corresponding static point ratio is updated.

Figure 11:
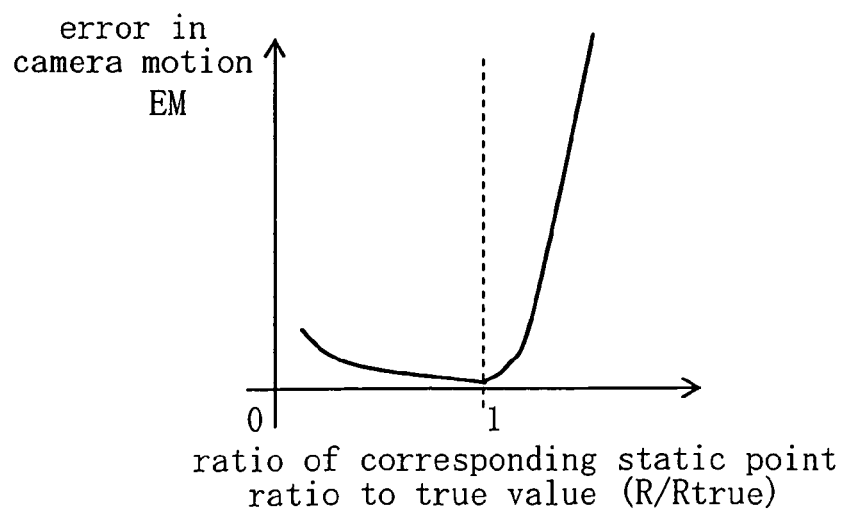
FIG. 11 is a graph showing a relationship between a corresponding static point ratio R and a true corresponding static point ratio Rtrue, and an error EM in a camera motion.

Here, when a corresponding static point ratio used in motion calculation is different from a true corresponding static point ratio, a calculated motion contains an error with respect to a true motion. FIG. 11 shows a relationship between the corresponding static point ratio R and the true corresponding static point ratio Rtrue, and an error EM in a camera motion. A graph of FIG. 11 schematically represents a common tendency based on the results of experiments performed by the present inventors. As can be seen from the graph of FIG. 11, when the corresponding static point ratio R is equal to the true corresponding static point ratio Rtrue (a ratio of R/Rtrue is 1), an error of EM of a camera motion is minimum. Therefore, calculation accuracy of a camera motion is decreased when the corresponding static point ratio R is either larger or smaller than the true corresponding static point ratio Rtrue, the calculation accuracy of a camera motion is reduced.

On the other hand, when a cycle of repetition of motion calculation is relatively short, a change in image of a surrounding of a vehicle is small, and therefore, a change in corresponding static point ratio is also small. Therefore, a corresponding static point ratio R(t−1) calculated using a motion obtained at time t−1 is expected to be close to a corresponding static point ratio Rtrue(t) in an image at time t. Therefore, by updating a corresponding static point ratio, a motion having a small error can be calculated.

Note that when a mobile body motion is calculated at time t using a corresponding static point ratio R(t−1) calculated at time t−1 and a corresponding static point ratio R(t) obtained from the mobile body motion is lower than the corresponding static point ratio R(t−1), a mobile body motion at time t may be calculated again using the new corresponding static point ratio R(t).

As can be seen from FIG. 11, when the corresponding static point ratio R is smaller than the true corresponding static point ratio Rtrue, an error in a camera motion is not so large. On the other hand, when the corresponding static point ratio R is larger than the true corresponding static point ratio Rtrue, an error in a camera motion is extremely large. Therefore, when R(t)<R(t−1), there is a possibility that a camera motion obtained using the corresponding static point ratio R(t−1) contains a large error. Therefore, when R(t)<R(t−1), by calculating a mobile body motion using a newly obtained R(t) again, higher accuracy motion calculation can be achieved.

Note that a corresponding static point ratio may be updated using the second motion Mb instead of the first motion Ma, or using both of them.

<Use of Predicted Value of Mobile Body Motion>

The mobile body motion prediction section 116 can predict a motion of the vehicle 1 using a first motion Ma previously obtained by the first motion calculation section 102, and outputs the predicted motion value. In this case, the motion evaluation selection section 113 calculates a first motion Ma, taking into consideration the predicted motion value output by the mobile body motion prediction section 116.

Here, for example, the mobile body motion prediction section 116 executes prediction, assuming that a motion of the vehicle 1 is substantially a constant velocity constant angular velocity motion. Specifically, a first motion Ma calculated at time t−1 is stored and is output as a predicted value Mrt of a motion at time t. The motion evaluation selection section 113 evaluates q camera motions Mj (j=1, ..., q) input from the motion candidate calculation section 112 and the predicted motion value Mrt, i.e., (q+1) camera motions, using (Expression 11) and (Expression 12) as described above. Thereafter, a best evaluation value is selected as a first motion Ma at time t.

As described above, there is the relationship of (Expression 10) between the number q of partial corresponding point sets and the guarantee rate z. Therefore, the guarantee rate z is less than one as long as the corresponding static point ratio R<1 and q is infinite. In other words, when a first motion Ma is obtained from q partial corresponding point sets, a motion containing a large error is calculated with a certain probability.

In contrast to this, by evaluating the predicted motion value Mrt as well to select a first motion Ma, the predicted motion value Mrt can be selected as a first motion Ma even if a correct motion is not obtained from the q partial corresponding point sets but a motion of the vehicle 1 is substantially a constant velocity constant angular velocity motion. As a result, it is possible to avoid the case where a large error occurs in the first motion Ma.

Although motion prediction is here executed, assuming that a mobile body is in a constant velocity constant angular velocity motion, but is not limited to this. For example, motion prediction may be performed, assuming that a mobile body is in a constant acceleration constant angular acceleration motion. In this case, it is possible to avoid the case where a large error occurs in the first motion Ma, as described above.

Note that mobile body motion prediction may be updated using the second motion Mb instead of the first motion Ma or using both of them.

Thus, according to the first embodiment, by assuming a predetermined plane on which corresponding points are present, the number of unknown parameters can be reduced, so that a first motion Ma less often containing a large error can be obtained. Further, by employing a search method using a first motion Ma as an initial value, a second motion Mb having a small error can be obtained.

Although a motion candidate is evaluated using an evaluation value Eji represented by (Expression 11) and (Expression 12) in the first embodiment, the evaluation technique is not limited to this. Any evaluation value which can be used to evaluate whether or not a corresponding point matches a camera motion, may be used. For example, an evaluation value indicating a relationship between a position (motion) of a camera and a corresponding point may be used. The evaluation value is called an epipolar constraint or a fundamental matrix. (Expression 13) is a specific example of the evaluation value.

(Expression 13)

$$E_{ji} = (ui' \ vi' \ f) \begin{pmatrix} 1 & wz & -wy \\ -wz & 1 & wx \\ wy & -wx & 1 \end{pmatrix} \begin{pmatrix} 0 & -t_Z & t_Y \\ t_Z & 0 & -t_X \\ -t_Y & t_X & 0 \end{pmatrix} \begin{pmatrix} ui \\ vi \\ f \end{pmatrix}$$

(Expression 13)

Although, for a camera motions Mj, the (n×R)-th smallest evaluation value among evaluation values Eji with respect to n corresponding points is selected as an evaluation value Ej in the first embodiment, a method of specifying an evaluation value Ej is not limited to this. For example, an average value of the first to (n×R)-th evaluation values Eji may be used as an evaluation value Ej.

Further, a method of specifying an evaluation value Ej may be changed, depending on a value of the corresponding static point ratio R. For example, when the corresponding static point ratio R is larger than a predetermined threshold, the (n×R)-th smallest evaluation value Eji may be used as an evaluation value Ej. On the other hand, when the corresponding static point ratio R is smaller than the predetermined threshold, an average value of the first to (n×R)-th smallest evaluation values Eji may be used as Ej.

According to this method, when the corresponding static point ratio R is relatively small, an influence of an error contained in an evaluation value can be suppressed by averaging a plurality of evaluation values. On the other hand, when the corresponding static point ratio R is relatively large, a single evaluation value is used as an evaluation value Ej, so that minute variations near the (n×R)-th smallest evaluation value are not averaged, and therefore, are reflected on the evaluation value Ej.

Although a second motion Mb is calculated using a search method in which a first motion Ma is used as an initial value in the first embodiment, the second motion Mb calculation is not limited to this. For example, it is assumed that the first motion calculation section 102 outputs a partial corresponding point and a plane expression based on which a first motion Ma has been calculated, instead of the first motion Ma, to the second motion calculation section 103. Thereafter, the second motion calculation section 103 may calculate a second motion Mb with another search method using the partial corresponding point, the plane expression, and n corresponding points output by the corresponding point calculation section 101. In the other search method, for example, o=3^3 plane expressions Sk(a±da, b±db, c±dc) (k=1, . . . , o) are calculated by increasing or decreasing the parameters of a plane expression S(a, b, c) as initial values by predetermined minute changes (da, db, dc). Next, camera motion candidates Mbk (k=1, . . . , o) are calculated from the partial corresponding point and the o plane expressions Sk based on which the first motion Ma has been calculated, using (Expression 9). Thereafter, evaluation values Ebk of motion candidates Mbk corresponding to n corresponding points are calculated using the above-described method, and a motion candidate Mbk having a smallest evaluation value Ebk is selected. Further, the above-described process is repeatedly performed using a plane expression Sk corresponding to the selected Mbk as an initial value. The process is ended when the value is converged or the number of repetitions reaches a predetermined number. Thereafter, the finally selected motion candidate Mbk is output as a second motion Mb. According to this method, it can be expected that, when a major factor for an error contained in the first motion Ma is a difference between a plane expression S and an actual road surface, a motion can be calculated again using a plane expression S close to an actual road surface. Therefore, it is considered that a motion containing a small error can be calculated. Further, with this method, a search space can be narrowed, thereby making it possible to reduce the process.

Among the parameters of the plane expression S(a, b, c), c is a scaling term. Therefore, a search for c may not have an effect. In such a case, o=3^2 plane expressions Sk(a±da, b±db, c) (k=1, . . . , o) may be used instead of o=3^3 plane expressions Sk(a±da, b±db, c±dc) (k=1, . . . , o).

Figure 12:
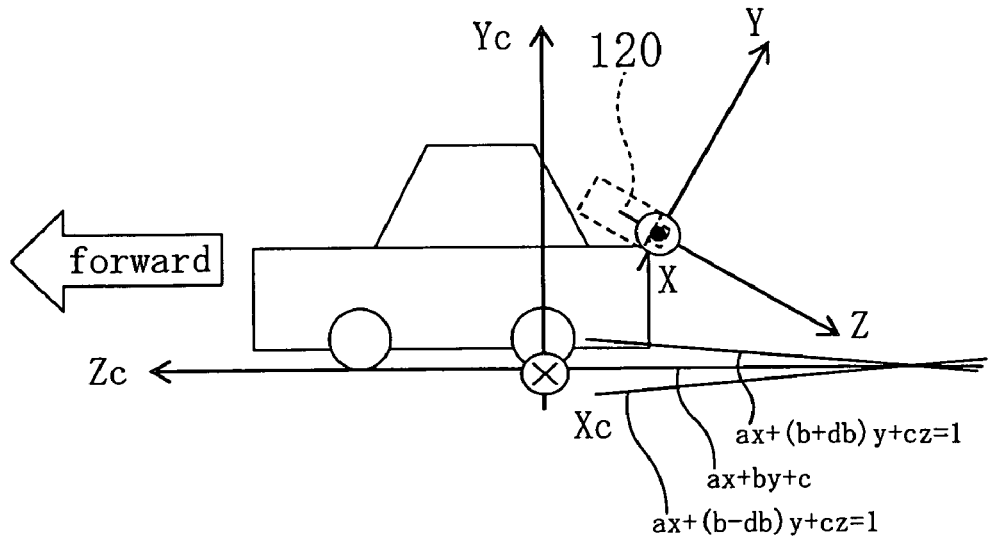
FIGS. 12(a) and 12(b) are diagrams conceptually showing a search using plane parameters.
Figure 12:
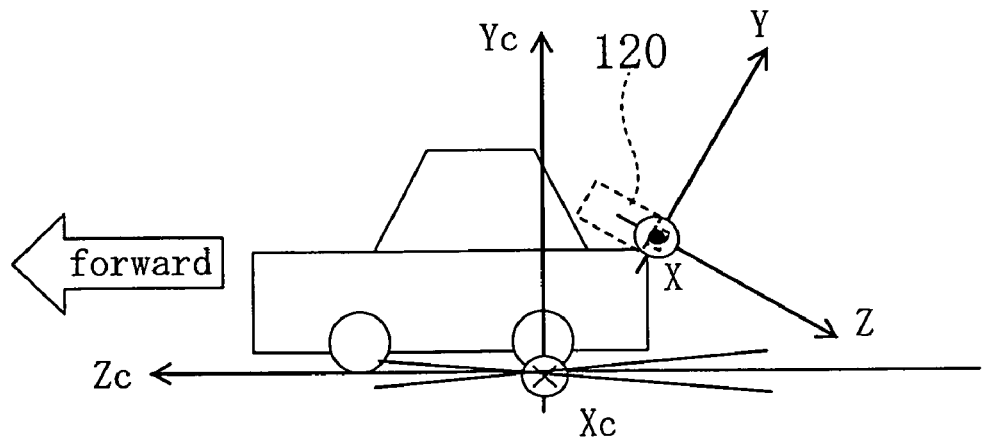

Further, in this method, when a search is performed using plane expressions Sk which are increased or decreased by predetermined minute amounts where a plane expression S(a, b, c) in the viewpoint coordinate system is used as an initial value, the plane expressions in the search are not associated with variations in an actual road surface as in FIG. 12(a). In contrast to this, as shown in FIG. 12(b), for example, a search may be performed using plane expressions Sk which are increased or decreased by predetermined minute changes (da, db, dc) where a plane is inclined using a center of an axle closer to a camera 120 (a center of a rear axle in the figure). In this case, it can be said that a change in positions of a vehicle and a road surface is further reflected. Therefore, motion calculation can be performed with a smaller number of repetitions or with a smaller error. As such predetermined minute changes, for example, various plane expressions S and minute changes (da, db, dc) thereof may be measured in a situation similar to that of FIG. 12 before use.

Although a second motion Mb output by the mobile body motion calculation apparatus 100 is used to superpose a trajectory of the moving vehicle 1 as shown in FIG. 7 in the first embodiment, application of a calculated mobile body motion is not limited to this.

Figure 13:
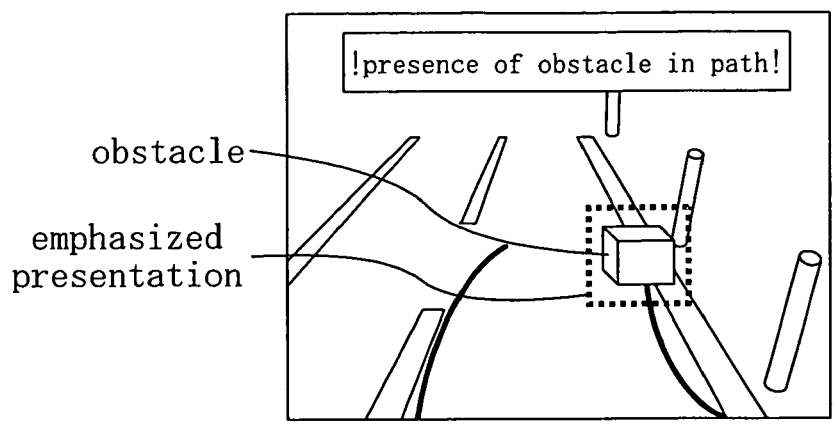
FIG. 13 shows an example of a synthesized image in which a warning message is superposed.

For example, the image synthesis apparatus 121 receives image coordinates and three-dimensional positions of corresponding points having the first to (n×R)-th smallest evaluation values Ei of a first motion Ma. Thereafter, when there is a corresponding point whose three-dimensional position is located on a path of a mobile body and which is within a predetermined range, among the (n×R) corresponding points, a warning message, such as that shown in FIG. 13, is superposed and the corresponding point may be emphasized by, for example, enclosing with a frame.

In the first embodiment, an output of the mobile body motion calculation apparatus 100 is supplied to the image synthesis apparatus 121 and the display 122. This does not put a limitation on applications of the mobile body motion calculation apparatus 100 or a mobile body motion which is output by the mobile body motion calculation apparatus 100. The mobile body motion calculation apparatus 100 may be combined with any other apparatuses.

Although the camera 120 is mounted on a rear portion of the vehicle 1 so as to capture an image of a rear view behind the vehicle, the position and capture range of a camera are not limited to this. A camera may be mounted at any position as long as an image of a surrounding of a vehicle can be captured by the camera.

Although a plane which is assumed for motion calculation is a road surface in the first embodiment, the assumed plane is not limited to a road surface. Any plane which can provide a position relative to a mobile body may be used.

Figure 14:
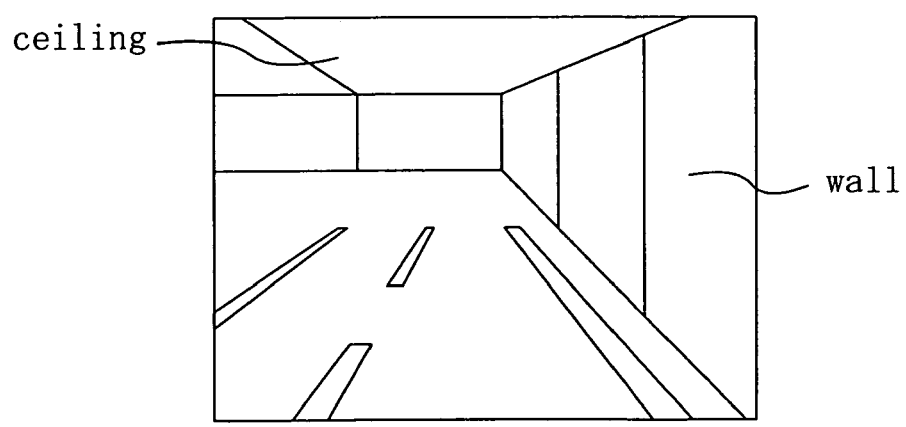
FIG. 14 shows an example of a captured image of an indoor parking lot.

For example, in an indoor place shown in FIG. 14, a ceiling surface can also previously provide a position relative to a mobile body. Therefore, a ceiling surface may be used as the assumed plane instead of a road surface. Alternatively, when a mobile body moves while keeping a predetermined distance to a wall surface, the wall surface may be used as the assumed plane instead of a road surface.

Figure 15:
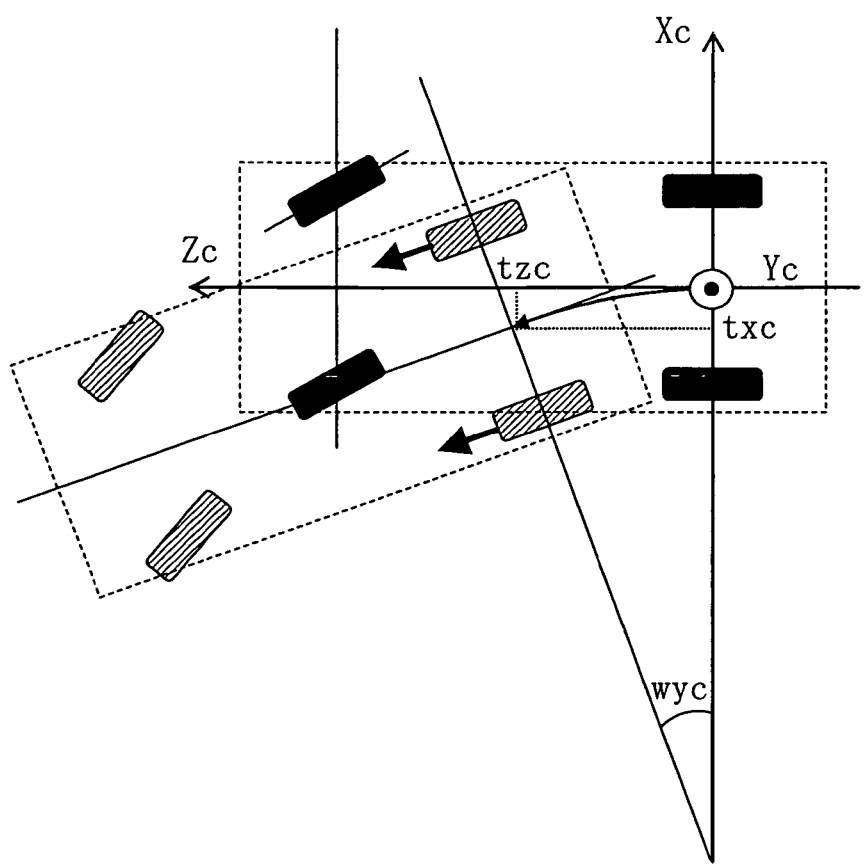
FIG. 15 is a diagram showing representation of a mobile body motion based on an Ackerman model.

Note that, in the first embodiment, representation of a mobile body motion, and a coordinate system for representing a motion of a mobile body, are not particularly limited. For example, a vehicle coordinate system may be defined so that a vertical axis is perpendicular to a straight line including an axle of a non-steered wheel of a vehicle, thereby representing a motion on a road surface of a vehicle as a circular arc movement around the vertical axis. FIG. 15 is a diagram showing representation of a mobile body motion based on the Ackerman model. In FIG. 15, a vehicle has front wheels which are steered wheels, and rear wheels which are non-steered wheels whose axle is fixed to the body of a car. In the vehicle, a center of a rotational component on a horizontal plane is placed on an extension of the axle of the non-steered wheels.

In this case, as shown in FIG. 15, if the vertical axis (Yc axis) of a coordinate system is placed passing through a center of the rear wheel, a constraint expression is established among (txc, tzc, wyc) of a vehicle motion. By providing such a constraint condition, the number of unknown parameters can be reduced, thereby making it possible to obtain a stabler solution.

Second Embodiment

In a second embodiment of the present invention, a mobile body motion calculation apparatus constructed in a manner similar to that of the first embodiment is combined with a navigation apparatus to construct a navigation system. It is here assumed that the navigation apparatus has a function of measuring a current location using a radio wave from an artificial satellite and a function of displaying the current location or guidance to a destination using the current location and map information.

Figure 16:
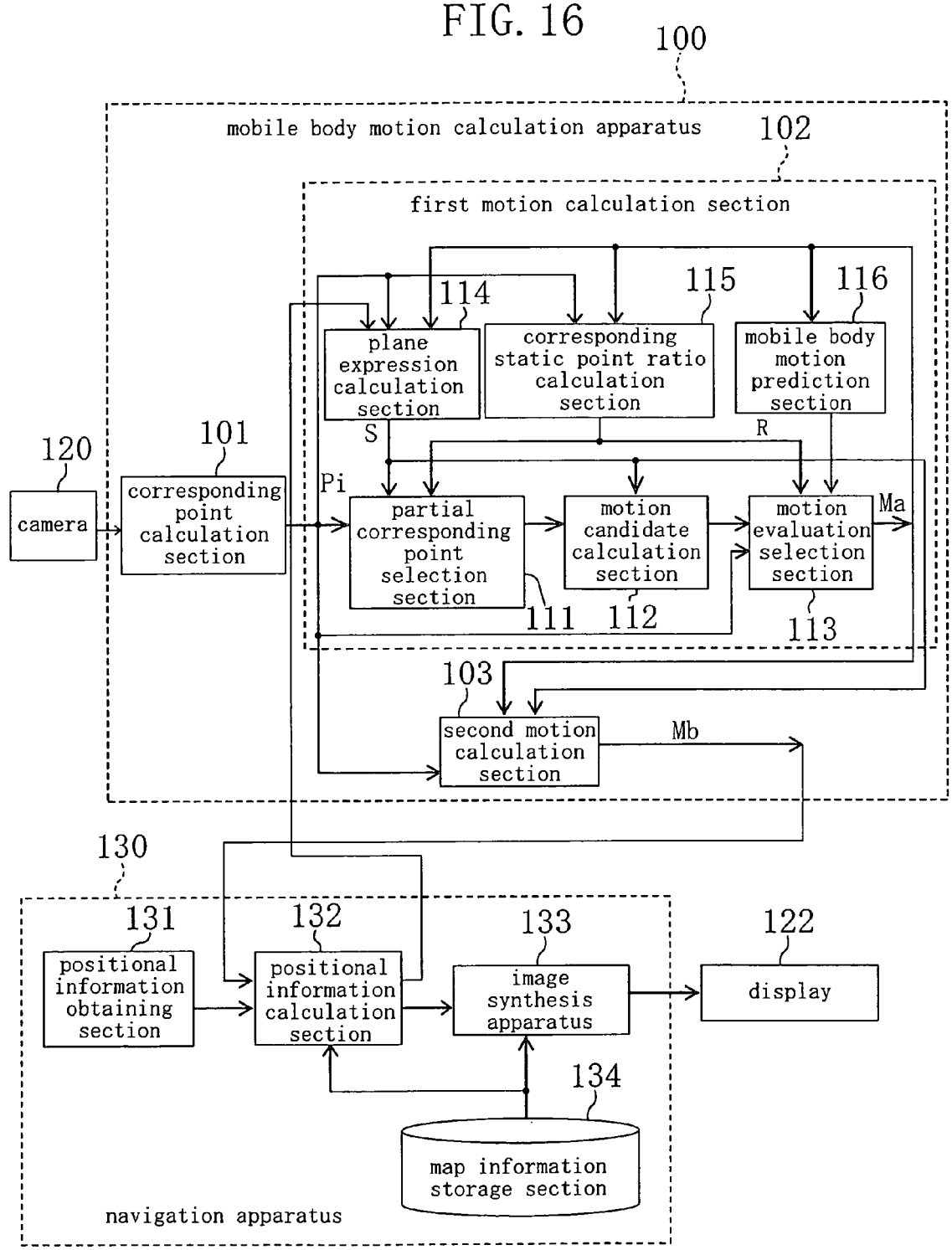
FIG. 16 is a structural diagram of a navigation system according to a second embodiment of the present invention.

FIG. 16 is a diagram showing a structure of a navigation system including a mobile body motion calculation apparatus according to the second embodiment of the present invention. In FIG. 16, components common to FIGS. 2 and 3 are indicated with the same reference numerals and will not be explained in detail.

In FIG. 16, a navigation apparatus 130 comprises a positional information obtaining section 131, a positional information calculation section 132, an image synthesis section 133, and a map information storage section 134. The positional information obtaining section 131 has a so-called GPS function to receive a radio wave from a plurality of artificial satellites to obtain information about a position of a vehicle. When the positional information obtaining section 131 can receive a radio wave from the satellite and obtain positional information using the GPS function (GPS function is effective), the positional information obtaining section 131 outputs the obtained positional information. When the positional information obtaining section 131 cannot obtain positional information using the GPS function (GPS function is ineffective) since, for example, a radio wave cannot be received from the satellite, the positional information obtaining section 131 outputs information indicating that positional information is not available. The positional information calculation section 132 receives the positional information from the positional information obtaining section 131 and mobile body motion information (second motion Mb) output from the mobile body motion calculation apparatus 100 to calculate a current location of a vehicle. The map information storage section 134 stores roadways and parking lots corresponding map coordinates, and map information. The image synthesis section 133 receives the current location from the positional information calculation section 132, reads a roadway and map information corresponding to the current location from the map information storage section 134, and converts the information to an image, which is in turn output.

An operation of a navigation system of FIG. 16 will be described. It is assumed that a vehicle is currently located outdoors and can receive a radio wave from a satellite, and the GPS function is effective. In this case, the positional information obtaining section 131 outputs positional information obtained by the GPS function. The positional information calculation section 132 receives the positional information received from the positional information obtaining section 131 and outputs the positional information without modification as a current location, and also temporarily stores the positional information. The image synthesis section 133 receives the current location from the positional information calculation section 132, reads map information about a surrounding of the current location which is stored in the map information storage section 134, and converts the map information to a map image, which is in turn output. The map image is displayed on the display 122.

When the positional information obtaining section 131 can obtain positional information using the GPS function, the positional information calculation section 132 ignores information about a mobile body motion input from the mobile body motion calculation apparatus 102.

Next, it is assumed that the vehicle is moved by manipulation of the driver to a place, such as an indoor parking lot or the like, where a radio wave cannot be received from a satellite and positional information cannot be obtained by the GPS function. In this case, the positional information obtaining section 131 outputs information indicating that the GPS function is ineffective. When receiving this information, the positional information calculation section 132 integrates a mobile body motion output from the mobile body motion calculation apparatus 100 with the current location stored therein to output and temporarily store a resultant new current location. The image synthesis section 133 operates in a manner similar to when the GPS function is effective, i.e., receives a current location from the positional information calculation section 132, reads map information about a surrounding of the current location, which is stored in the map information storage section 134, and converts the map information to a map image, which is in turn output. The map image is displayed on the display 122.

In addition to current location calculation, the positional information calculation section 132 optionally reads information about a parking lot which is stored in the map information storage section 134, and outputs the information to the plane expression calculation section 114. The plane expression calculation section 114 optionally reads and outputs information about a plane expression which is contained in the parking lot information.

Thereafter, the vehicle may be moved by manipulation of the driver, so that a radio wave can be received again and the GPS function is effective. In this case, the positional information calculation section 132 outputs positional information obtained by the positional information obtaining section 131 as a current location.

Figure 17:
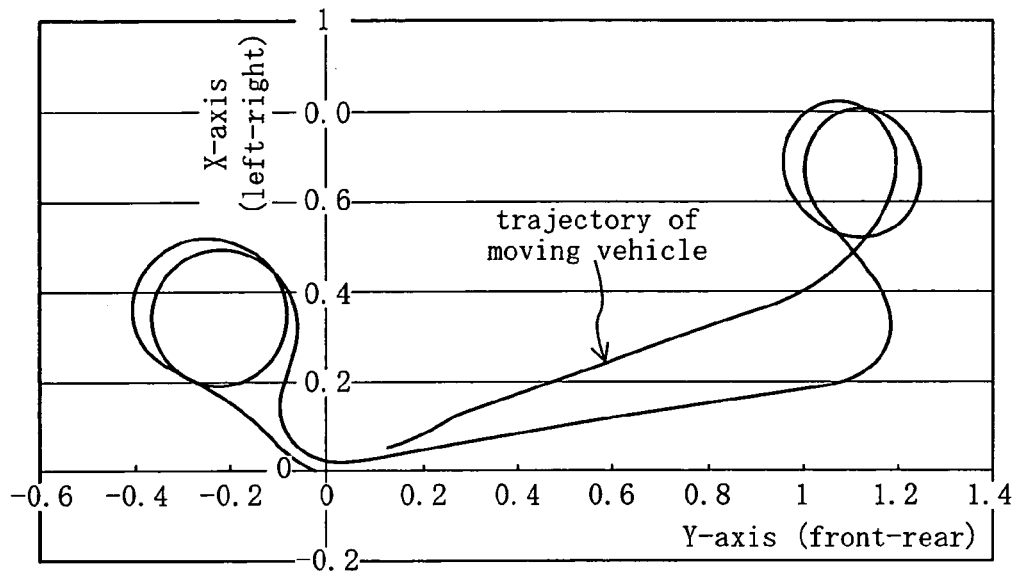
FIG. 17 is a graph showing a trajectory of a moving vehicle obtained by an experiment performed in an indoor parking lot.

FIG. 17 is a graph showing a trajectory of a moving vehicle which is obtained in an experiment in which the mobile body motion calculation method of the present invention was used in an indoor parking lot. As described above, according to the mobile body motion calculation method of the present invention, a mobile body motion can be calculated using only images captured by a camera mounted on a vehicle, and in addition, it is possible to suppress an error to a small value even when a road surface is inclined. Therefore, as shown in FIG. 17, it is also possible to calculate a moving trajectory containing a small error in an indoor parking lot.

However, as described above using the graph of FIG. 8(b), as the moving velocity of a mobile body is increased, a large error is likely to occur in a corresponding point search (a decrease in corresponding point correct solution ratio). When the corresponding point error is excessively large, a significant error occurs in a mobile body motion.

To address such a problem, in the navigation system of the second embodiment, the mobile body motion calculation apparatus 100 is used only in indoor places where a radio wave cannot be received from a satellite. In outdoor places where a radio wave can be received from a satellite, positional information obtained by the GPS function is used as a current location. Thereby, it is possible to calculate a current location with high accuracy.

In other words, according to the second embodiment, the current location calculation method is selectively switched, depending on whether or not positional information can be obtained by the GPS function, thereby making it possible to consistently calculate a current location either in outdoor places where the GPS function is effective or indoor places where a radio wave cannot be received.

In the second embodiment, the current location calculation method is switched, depending on whether or not a current location can be obtained by the GPS function. However, the present invention is not limited to this. For example, the current location calculation method is switched, depending on whether or not the calculated current location is near an entrance of an indoor parking lot on map information.

In the second embodiment, a plane assumed for motion calculation is not limited to a road surface, and any plane which can give a position relative to a mobile body can be employed, as in the first embodiment.

For example, when an indoor parking lot has a structure, such as that shown in FIG. 14, a plane expression where the ceiling is assumed to be a plane is stored along with map information in the map information storage section 134. The positional information calculation section 132, when a current location corresponds to the indoor parking lot of FIG. 14, reads the plane expression of the ceiling of the indoor parking lot from the map information storage section 134, and outputs the plane expression to the plane expression calculation section 114 of the first motion calculation section 102. The plane expression calculation section 104, when the positional information calculation section 132 outputs the plane expression, outputs the plane expression. Thereby, the mobile body motion calculation apparatus 100 calculates a mobile body motion using the ceiling plane as a reference.

In the present invention, since a mobile body motion is calculated using images captured by a camera, it is expected that calculation accuracy is further improved when a ceiling is used as an assumed plane than when a road surface is used in, for example, an indoor parking lot in which the road surface is dark while the ceiling is light. Therefore, when plane expressions corresponding to positional information are previously stored in the map information storage section 134 and the mobile body motion calculation apparatus 100 selectively uses the plane expressions, depending on a current location, it is possible to calculate a mobile body motion with higher accuracy.

Although a vehicle is used as an example of a mobile body in each of the above-described embodiments, the type of the mobile body is not limited to a vehicle. For example, the mobile body may be a robot.

Figure 18:
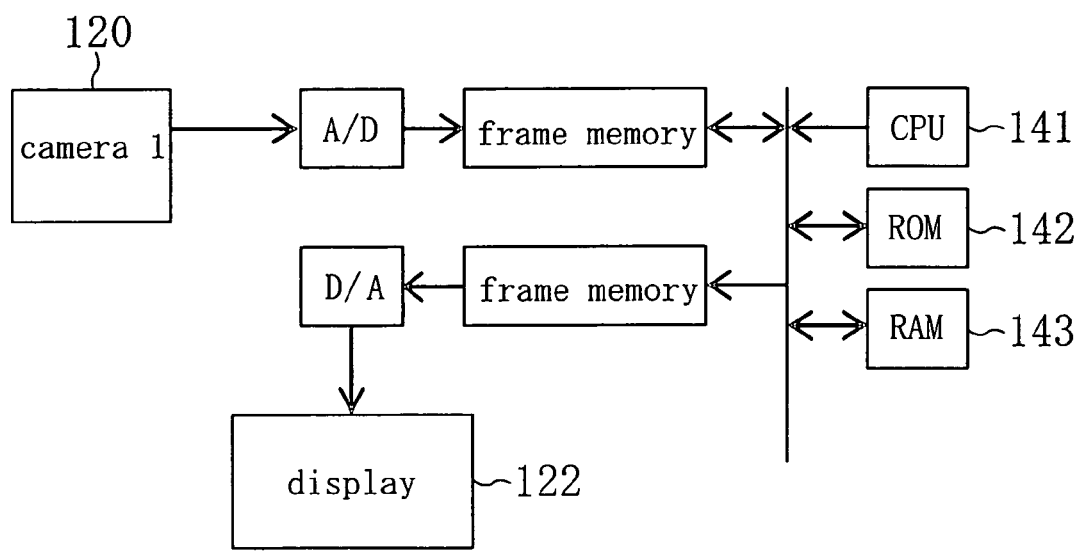
FIG. 18 is a diagram showing another structure for implementing the present invention.

In each of the above-described embodiments, each processing means and apparatus may be implemented by either hardware or software. For example, as shown in FIG. 18, a computer comprising a CPU 141, a ROM 142 and a RAM 143, and a function of inputting/outputting images, may be used to implement each processing means by software.

INDUSTRIAL APPLICABILITY

According to the present invention, a motion of a mobile body on which a camera is mounted can be obtained using camera images with high accuracy. Therefore, the present invention is applicable for, for example, a vehicle, a mobile robot and the like, so that a traveling control thereof, presentation of a path and a position to the user, and the like can be provided.

The invention claimed is:

1. A computer-implemented method of obtaining a motion of a mobile body on which a camera is mounted, using images of a surrounding of the mobile body captured by the camera, comprising:

a corresponding point calculation step of obtaining a plurality of corresponding points from two of the images having different capturing times;

a first motion calculation step of obtaining a first motion indicating the motion of the mobile body using the plurality of corresponding points, assuming a predetermined plane in the images; and a second motion calculation step of obtaining a second motion indicating the motion of the mobile body using the first motion and the plurality of corresponding points, wherein the first motion calculation step comprises:

a first step of selecting q (where q is an integer of two or more) partial corresponding point sets each composed of m (where m is an integer of 3 or more) corresponding points from the plurality of corresponding points;

a second step of calculating a candidate for the motion of the mobile body from each of the q partial corresponding point sets selected in the first step with a plane expression defining the plane; and a third step of evaluating the q motion candidates caculated in the second step with a predetermined evaluation technique, and based on a result of the evaluation, specifying the first motion.

2. The method of claim 1, wherein the plane is a road surface, a ceiling surface, or a wall surface.

3. The method of claim 1, wherein, in the first motion calculation step, the first motion is calculated using three of the corresponding points.

4. The method of claim 1, wherein the first motion calculation step comprises a step of updating a plane expression defining the plane using the first or second motion which has been previously obtained.

5. A computer-implemented method of obtaining a motion of a mobile body on which a camera is mounted, using images of a surrounding of the mobile body captured by the camera, comprising:

a corresponding point calculation step of obtaining a plurality of corresponding points from two of the images having different capturing times;

a first motion calculation step of obtaining a first motion indicating the motion of the mobile body using the plurality of corresponding points, assuming a predetermined plane in the images; and a second motion calculation step of obtaining a second motion indicating the motion of the mobile body using the first motion and the plurality of corresponding points, wherein in the second motion calculation step, the second motion is calculated using a search technique, in which the plurality of corresponding points are evaluated where the first motion is used as an initial value, wherein in the second motion calculation step, the evaluation is performed using a corresponding static point ratio which is a ratio of a corresponding static point or points.

6. The method of claim 1, wherein the first motion calculation step comprises a step of calculating a corresponding static point ratio which is a ratio of a corresponding static point or points using the plurality of corresponding points and the first or second motion which has been previously obtained; and in the third step, the calculated corresponding static point ratio is used for evaluation to specify the first motion.

7. The method of claim 1, wherein the first motion calculation step comprises a step of obtaining a predicted value of the motion of the mobile body from the first or second motion which has been previously obtained; and in the third step, the first motion is specified, taking the predicted value into consideration.

8. The method of claim 1, wherein in the second motion calculation step, the second motion is calculated using a search technique, in which the plurality of corresponding points are evaluated where the first motion is used as an initial value.

9. A computer-implemented method of obtaining a motion of a mobile body on which a camera is mounted, using images of a surrounding of the mobile body captured by the camera, comprising:

a corresponding point calculation step of obtaining a plurality of corresponding points from two of the images having different capturing times;

a first motion calculation step of obtaining a first motion indicating the motion of the mobile body using the plurality of corresponding points, assuming a predetermined plane in the images; and a second motion calculation step of obtaining a second motion indicating the motion of the mobile body using the first motion and the plurality of corresponding points, wherein the mobile body has a non-steered wheel whose axle direction is fixed; and in the first and second motion calculation steps, a vertical axis of a coordinate system for representing the motion of the mobile body is placed perpendicular to a straight line including the axle of the non-steered wheel, and a motion on a road surface of the mobile body is obtained as a circular arc movement around the vertical axis.

10. The method of claim 1, wherein the mobile body is a vehicle; and in the second motion calculation step, the partial corresponding point corresponding to the first motion and the plane expression indicating the plane are used instead of the first motion, and the second motion is obtained using a search technique, in which the plurality of corresponding points are evaluated while inclining the plane around a center of an axle near the camera where the plane expression is used as an initial value.

11. The method of claim 9, wherein the vertical axis is placed passing through a central position of the non-steered wheel.

* * * * *

UNITED STATES PATENT AND TRADEMARK OFFICE
CERTIFICATE OF CORRECTION

PATENT NO. : 7,542,834 B2  
APPLICATION NO. : 10/540135  
DATED : June 2, 2009  
INVENTOR(S) : Nobori et al.

Page 1 of 1

It is certified that error appears in the above-identified patent and that said Letters Patent is hereby corrected as shown below:

On the Cover page, (*) Notice: Subject to any disclaimer, the term of this patent is extended or adjusted under 35 USC 154(b) by (533) days.

Delete the phrase "by 533 days" and insert -- by 926 days --.

Signed and Sealed this

Tenth Day of August, 2010

David J. Kappos
*Director of the United States Patent and Trademark Office*